United States Patent
Tompkins et al.

(10) Patent No.: US 9,680,742 B2
(45) Date of Patent: *Jun. 13, 2017

(54) PACKET OUTPUT PROCESSING

(71) Applicant: Cavium, Inc., San Jose, CA (US)

(72) Inventors: Joseph B. Tompkins, Westborough, MA (US); Brian Robert Folsom, Northborough, MA (US); Wilson P. Snyder, II, Holliston, MA (US); Richard E. Kessler, Northborough, MA (US); Edwin Langevin, Coronado, CA (US); Andrew J. Jones, Littleton, MA (US); Ethan F. Robbins, North Grafton, MA (US); Krupa Sagar O. S. Mylavarapu, Marlborough, MA (US); Mahesh Dorai, Westford, MA (US); Nagaraj G. Shirali, Acton, MA (US); Ranjith Kumar V. Hallur, Village of Nagag Woods, MA (US)

(73) Assignee: Cavium, Inc., San Jose, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 14/193,895

(22) Filed: Feb. 28, 2014

(65) Prior Publication Data
US 2015/0249603 A1    Sep. 3, 2015

(51) Int. Cl.
*H04L 12/28*    (2006.01)
*H04L 12/56*    (2006.01)
(Continued)

(52) U.S. Cl.
CPC ........... *H04L 45/74* (2013.01); *H04L 45/566* (2013.01); *H04L 47/34* (2013.01); *H04L 47/50* (2013.01);
(Continued)

(58) Field of Classification Search
CPC ..... H04L 45/74; H04L 45/566; H04L 47/225; H04L 49/821; H04L 69/22;
(Continued)

(56) References Cited

U.S. PATENT DOCUMENTS 6,430,620 B1     8/2002  Omura et al.
7,965,708 B2 *   6/2011  Cohen ..................... H04L 47/32
                                                            370/389
(Continued)

FOREIGN PATENT DOCUMENTS

EP      2 575 329 A1    4/2013
TW        538609 B      6/2003
(Continued)

OTHER PUBLICATIONS

Notification of Transmittal of International Search Report and Written Opinion of the International Searching Authority of PCT/US2014/072835, "Packet Shaping in a Network Processor," date mailed Mar. 23, 2015.

(Continued)

*Primary Examiner* — Lonnie Sweet
(74) *Attorney, Agent, or Firm* — Hamilton, Brook, Smith & Reynolds, P.C.

(57) ABSTRACT

A circuit operates to manage transmittal of packets in a network packet processor. The circuit includes a packet descriptor manager (PDM), a packet scheduling engine (PSE), and a packet engines and buffering module (PEB). The PDM generates a metapacket and a descriptor from a command signal, where the command signal identifies a packet to be transmitted by the circuit. The PSE determines an order in which to transmit the packet among a number of packets, where the PSE determines the order based on information indicated in the metapacket. Once the packet is scheduled for transmission, the PEB performs processing (Continued)

operations on the packet to produce a processed packet based on instructions indicated in the descriptor. The PEB then causes the processed packet to be transmitted toward the destination.

24 Claims, 26 Drawing Sheets

(51) Int. Cl.
H04L 12/741 (2013.01)
H04L 12/721 (2013.01)
H04L 12/911 (2013.01)
H04L 29/06 (2006.01)
H04L 12/863 (2013.01)
H04L 12/801 (2013.01)
H04L 12/823 (2013.01)

(52) U.S. Cl.
CPC ........ *H04L 47/6225* (2013.01); *H04L 47/821* (2013.01); *H04L 69/22* (2013.01); *H04L 47/32* (2013.01)

(58) Field of Classification Search
CPC ....... H04L 2012/5679; H04L 2012/568; H04L 2012/5681
See application file for complete search history.

(56) References Cited

U.S. PATENT DOCUMENTS

| | | | |
|---|---|---|---|
| 9,397,938 | B2 | 7/2016 | Folsom et al. |
| 2002/0145982 | A1* | 10/2002 | Talpade .............. H04L 12/5695 370/253 |
| 2004/0258072 | A1 | 12/2004 | Deforche |
| 2006/0274773 | A1 | 12/2006 | Cohen et al. |
| 2007/0104210 | A1 | 5/2007 | Wu et al. |
| 2007/0153818 | A1 | 7/2007 | Lakshmanamurthy et al. |
| 2008/0016265 | A1 | 1/2008 | Oshikiri et al. |
| 2009/0122700 | A1 | 5/2009 | Aboba et al. |
| 2009/0303876 | A1* | 12/2009 | Wu .......................... H04L 47/10 370/230.1 |
| 2010/0039957 | A1* | 2/2010 | Kotrla ................. H04L 41/5009 370/253 |
| 2010/0278190 | A1 | 11/2010 | Yip et al. |
| 2011/0219113 | A1 | 9/2011 | Grewal et al. |
| 2012/0009890 | A1* | 1/2012 | Curcio .................... H04L 29/06 455/230 |
| 2012/0263192 | A1 | 10/2012 | Yoshimoto |
| 2015/0249604 | A1 | 9/2015 | Folsom et al. |
| 2015/0249620 | A1* | 9/2015 | Folsom ................. H04L 45/566 370/392 |

FOREIGN PATENT DOCUMENTS

| | | |
|---|---|---|
| WO | WO 02/13034 A1 | 2/2002 |
| WO | WO 2013/064603 A1 | 5/2013 |
| WO | WO 2015/130402 A1 | 9/2015 |
| WO | WO 2015/130403 A1 | 9/2015 |
| WO | WO 2015/130404 A1 | 9/2015 |

OTHER PUBLICATIONS

Notification of Transmittal of International Search Report and Written Opinion of the International Searching Authority of PCT/US2014/072826, "Packet Scheduling in a Network Processor," date mailed Mar. 9, 2015.

Notification of Transmittal of International Search Report and Written Opinion of the International Searching Authority of PCT/US2014/072820, "Packet Output Processing," date mailed Mar. 26, 2015.

Office Action and Search Report for Taiwanese Patent Application No. 104105253, "Packet Scheduling in a Network Processor," date mailed Apr. 19, 2016.

\* cited by examiner

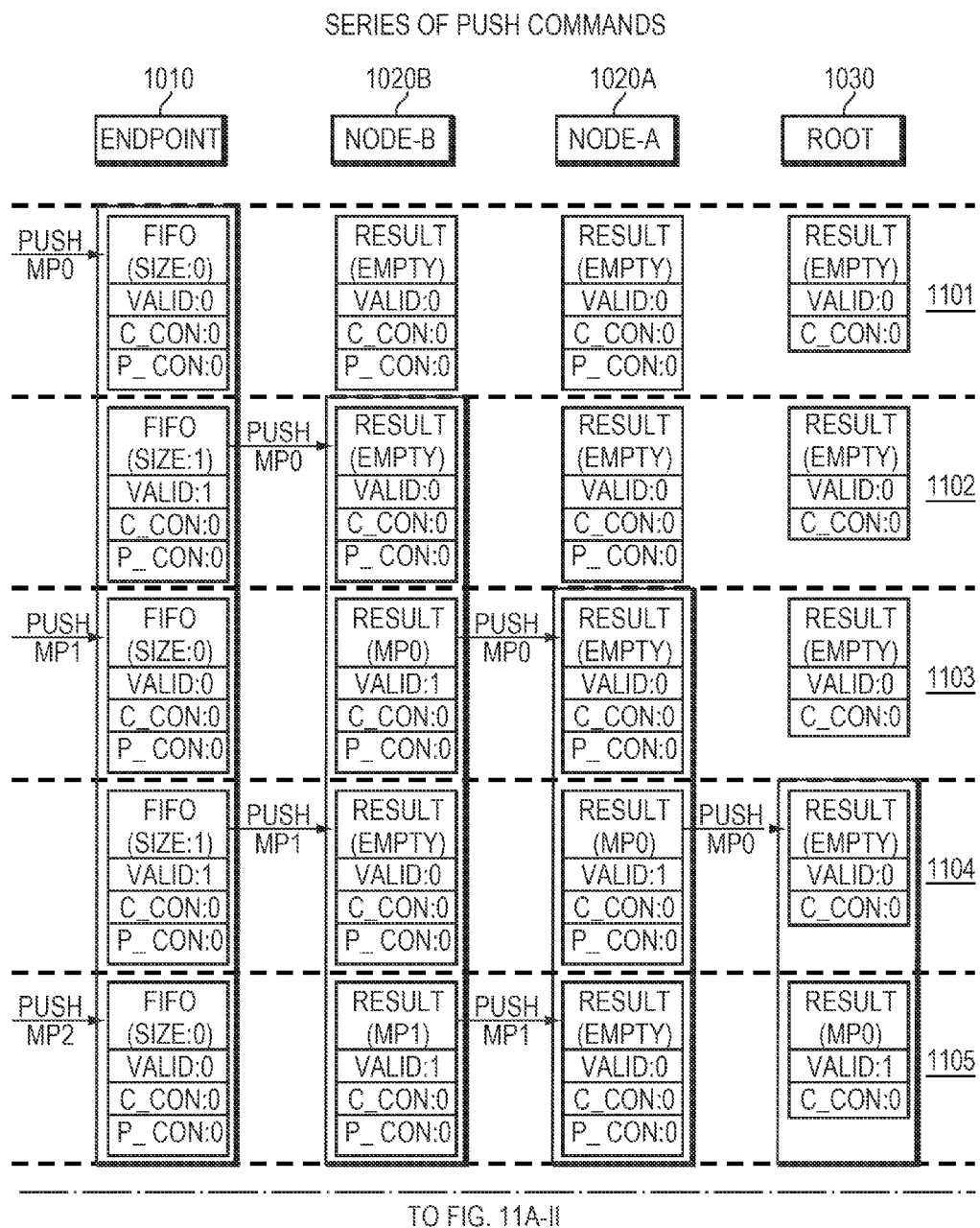
FIG. 11A-I

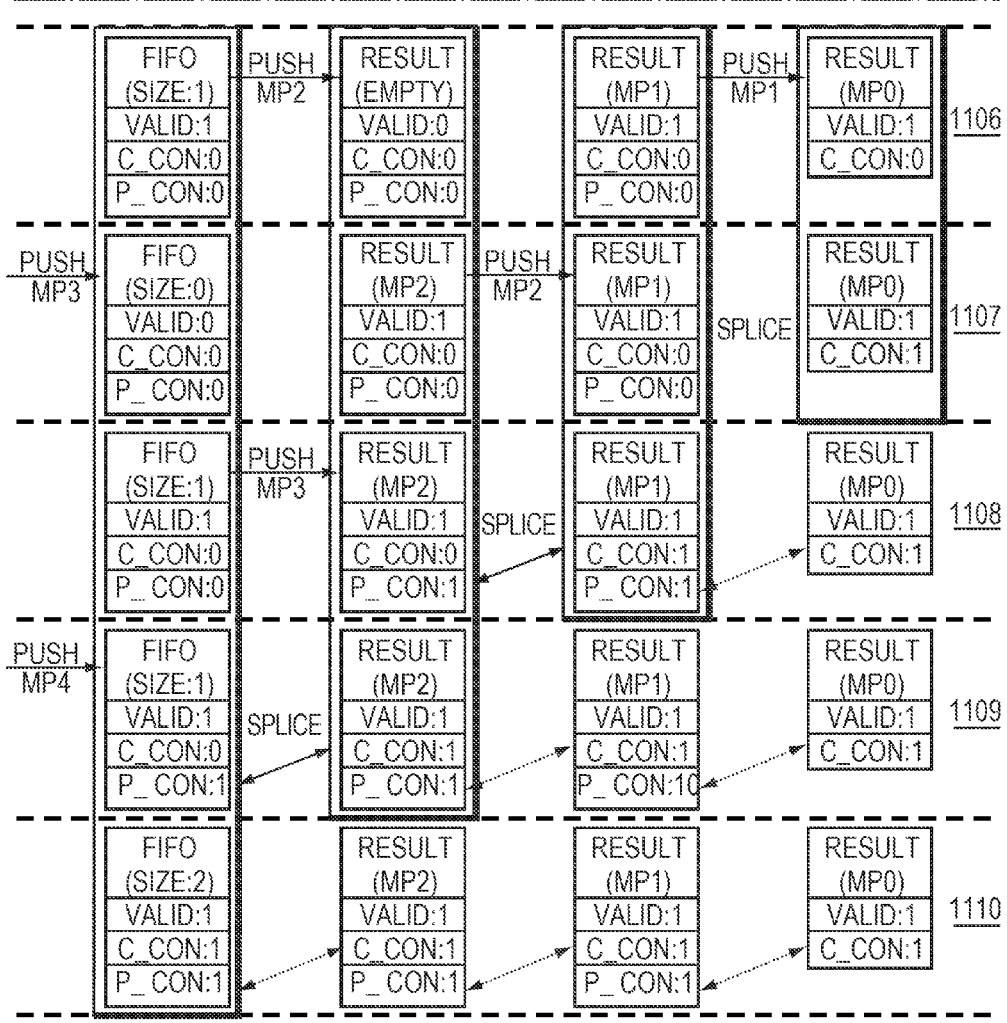
FIG. 11A-II

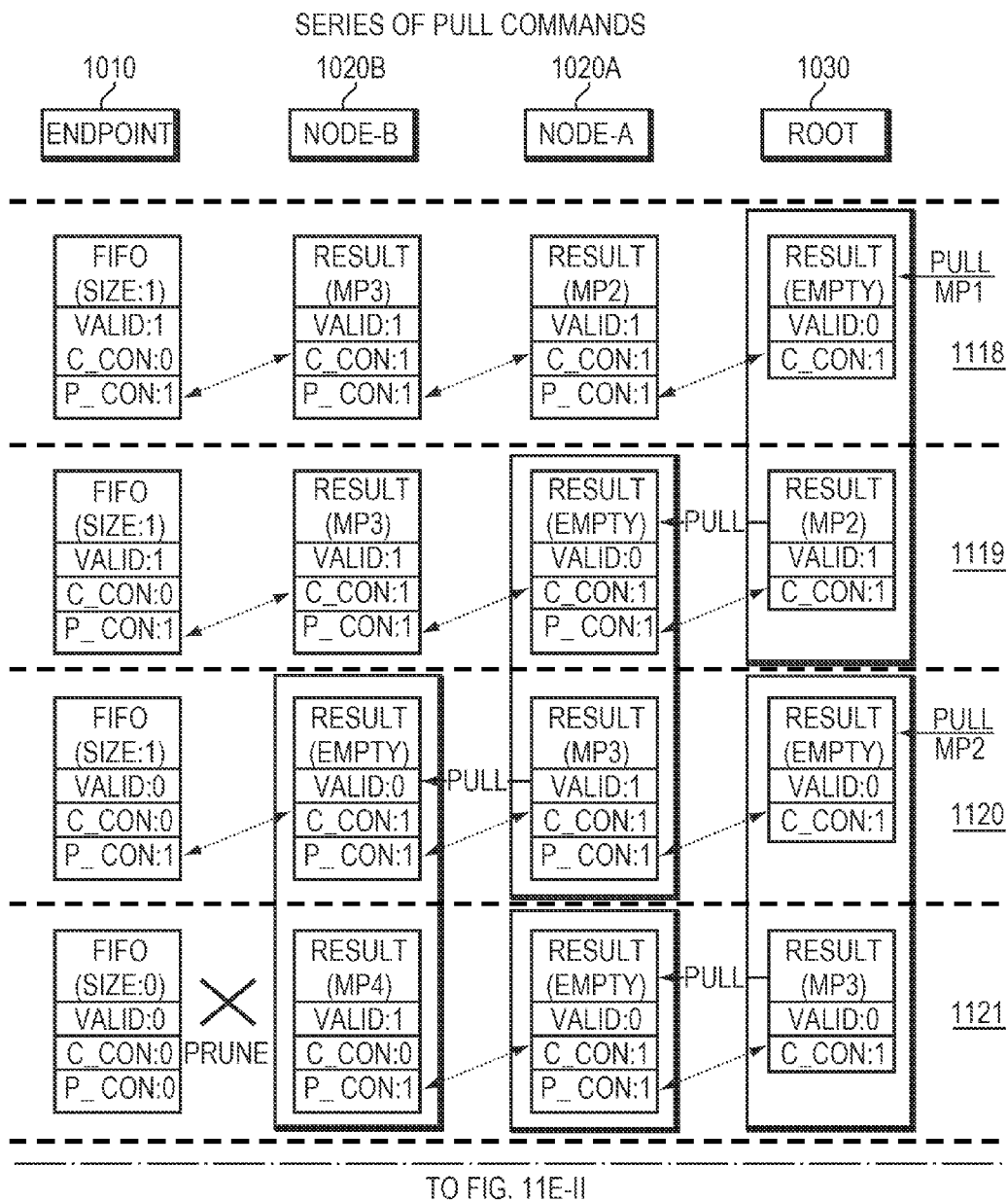
FIG. 11E-I

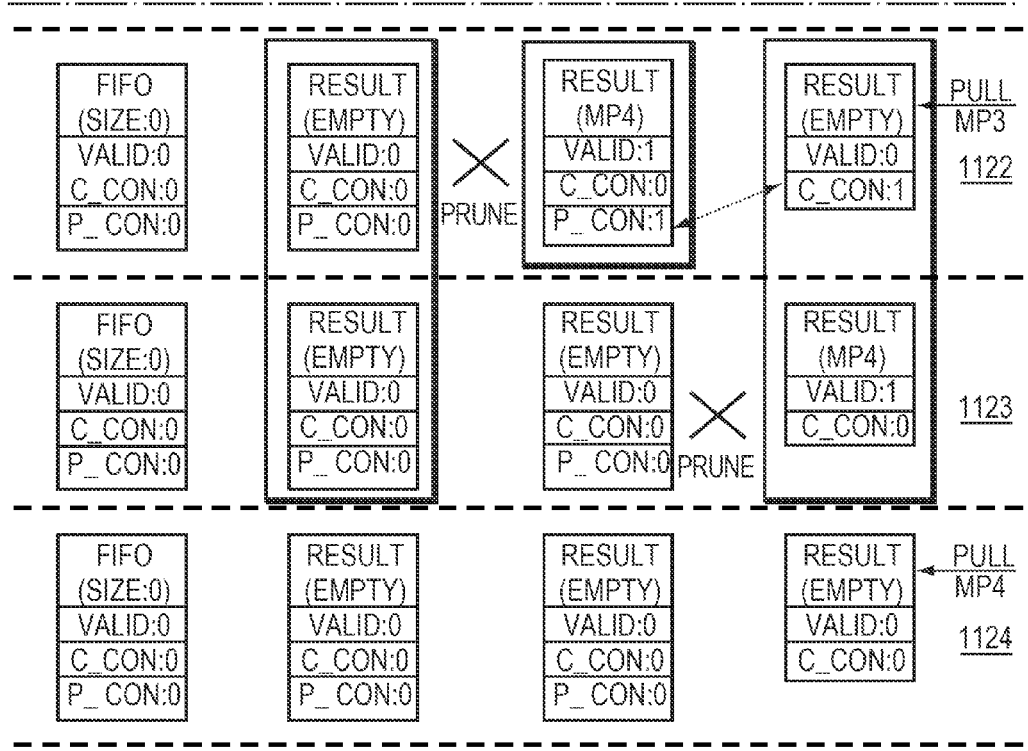
FIG. 11E-II

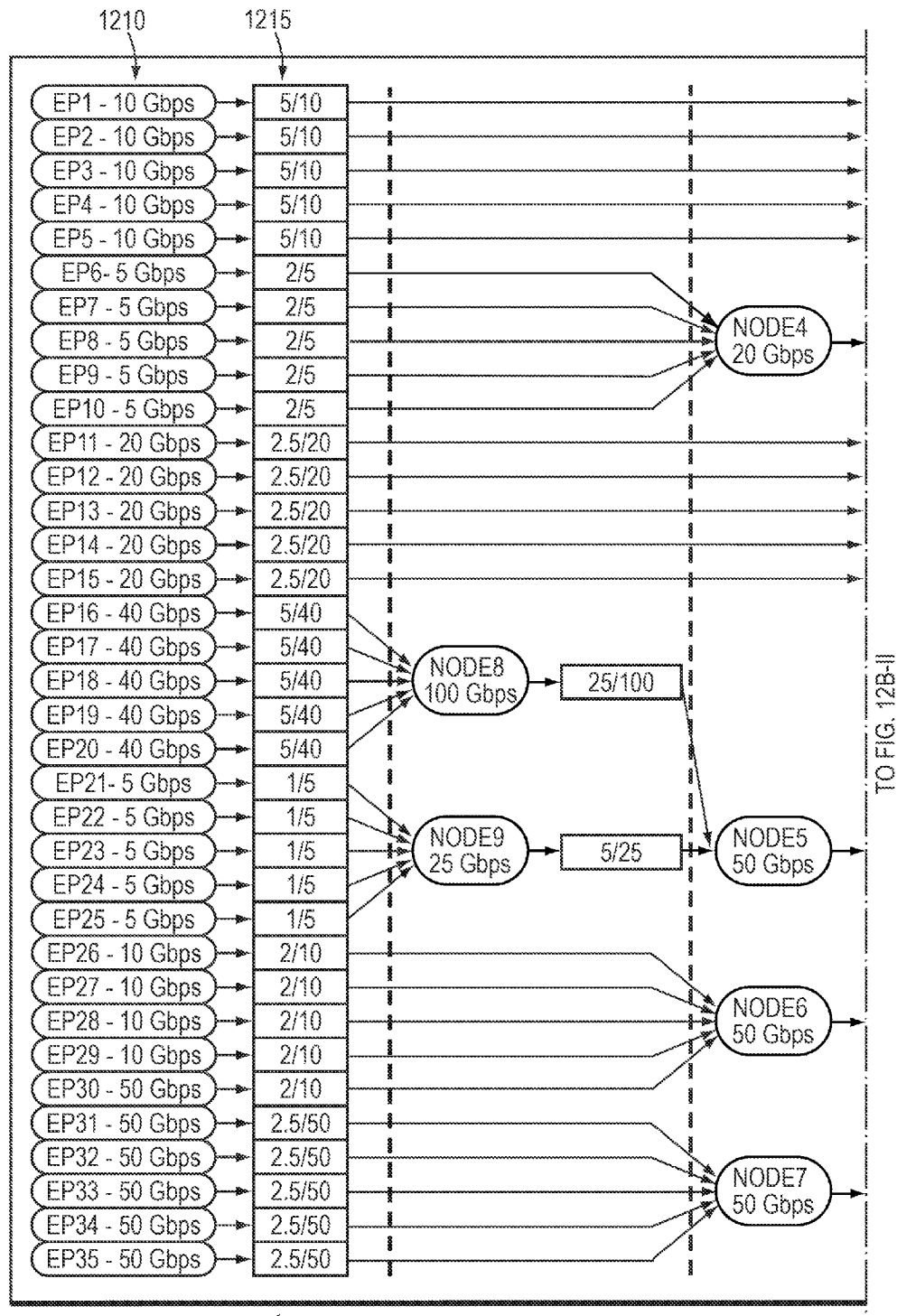
FIG. 12B-I

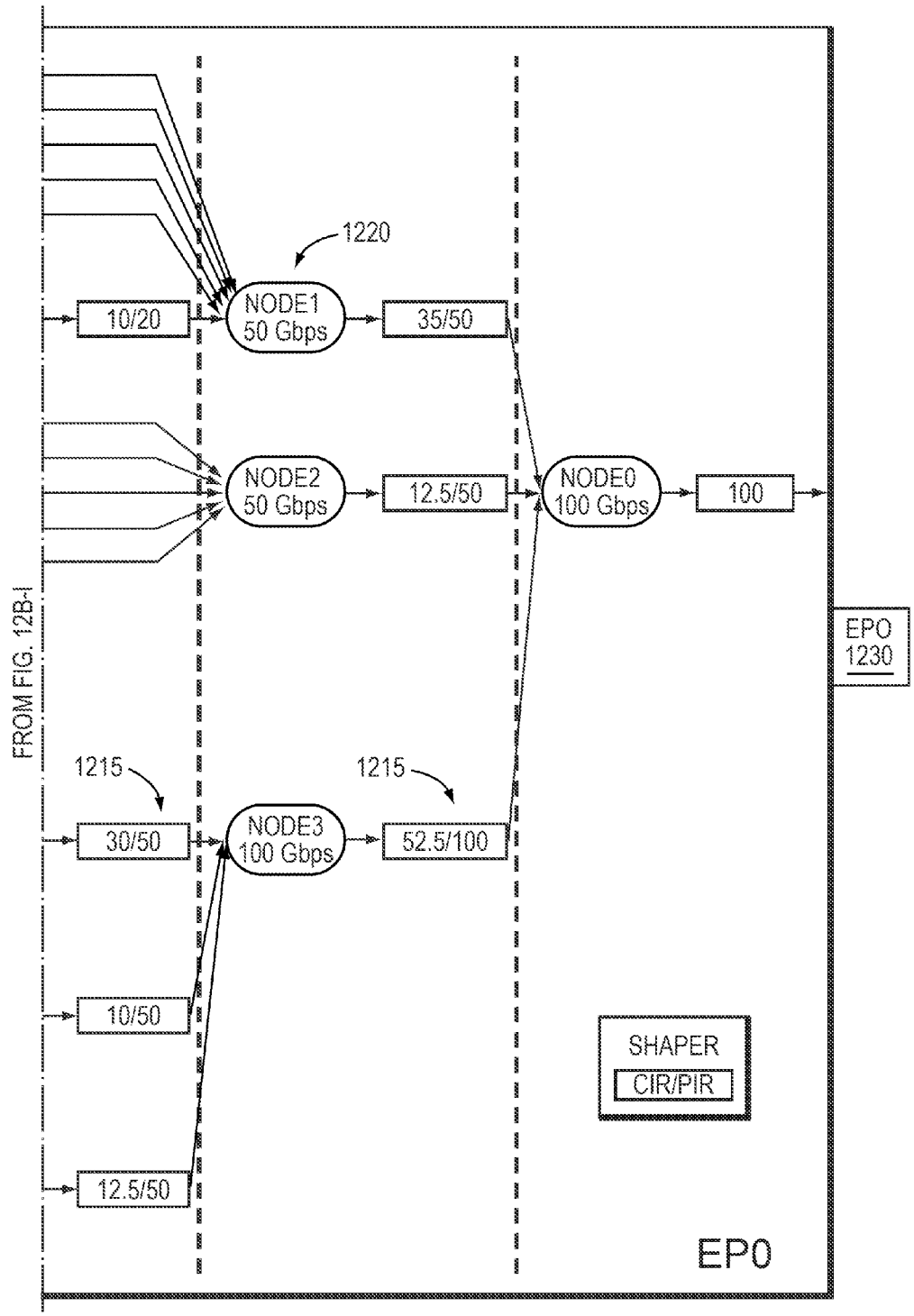
FIG. 12B-II

PACKET OUTPUT PROCESSING

BACKGROUND

Typical network processors schedule and queue work such as packet processing operations for upper level network protocols, and allow processing with respect to upper level network protocols (e.g., transport and application layers) in received packets before forwarding the packets to connected devices. The functions typically performed by network processors include packet filtering, queue management and priority, quality of service enforcement, and access control. By employing features specific to processing packet data, network processors can optimize an interface of a networked device.

SUMMARY

Example embodiments of the invention provide a circuit for managing transmittal of packets in a network packet processor. The circuit may include a packet descriptor manager (PDM), a packet scheduling engine (PSE), and a packet engines and buffering module (PEB). The PDM may generate a metapacket and a descriptor from a command signal, where the command signal identifies a packet to be transmitted by the circuit. The PSE may determine an order in which to transmit the packet among a number of packets, where the PSE determines the order based on a size and a destination of the packet indicated in the metapacket. Once the packet is scheduled for transmission, the PEB performs processing operations on the packet to produce a processed packet based on instructions indicated in the descriptor. The PEB then causes the processed packet to be transmitted toward the destination.

In further embodiments, the PDM further includes a metapacket queue, the PDM being configured to store the metapacket to the metapacket queue. The PSE may be further configured to retrieve at least a portion of the metapacket from the metapacket queue. The PDM may also include a descriptor queue, where the PDM stores the descriptor to the descriptor queue. The PEB may retrieve at least a portion of the descriptor from the descriptor queue.

In still further embodiments, the PSE may compare a packet transmission rate associated with the destination against at least one of a peak rate and a committed rate associated with the destination, the PSE determining the order based on the comparison. Based on this comparison, the PSE may assign a color to the packet. The PSE may also compare, for a plurality of nodes in a path between the circuit and the destination, a packet transmission rate associated with the node against at least one of a peak rate and a committed rate associated with the node, the PSE determining the order based on the comparison.

In yet further embodiments, the PSE may model transmission of the packet through a model of a network topology from the destination to the circuit, the PSE determining the order based on the model transmission. To accomplish this, the PSE may model a plurality of nodes in the network topology between the destination and the circuit, and may determine the order based on arrival of the packet relative to other packets at the circuit in the model transmission. The PSE may also model transmission of the plurality of packets from a plurality of respective destinations to the circuit, the PSE determining the order based arrival of the packet among the plurality of packets in the model transmission. The PSE may further model a plurality of nodes in the network topology between the plurality of destinations and the circuit, and may assign relative priority to each of the inputs of the model plurality of nodes. The model transmission may be based on a deficit-weighted round robin calculation.

In yet still further embodiments, the PEB may construct the packet based on pointers in the descriptor, the pointers indicating addresses of a memory storing the packet. The PEB may also store the processed packet to an output buffer, the PEB causing the packet to be transmitted based on a credit status associated with the buffer. The metapacket can include an indication of a size of the packet and instructions for ordering the packet. In contrast, the descriptor may include pointers indicating addresses of a memory storing the packet, as well as instructions for processing the packet by the PEB. Instructions for constructing and processing the packet may be provided by the command signal. The PEB may mark the packet with a color indicating compliance with packet traffic rules, and may add a timestamp to the packet. The PEB may also selectively drop a packet based on an indication from the PSE.

In yet further embodiments, a method of managing transmittal of packets is provided. In one such method, a command signal is received, the command signal identifying a packet to be processed and transmitted. A metapacket is generated from the command signal, the metapacket including an indication of a size of the packet and instructions for ordering the packet. A descriptor is also generated from the command signal, where the descriptor includes pointers indicating addresses of a memory storing the packet, as well as instructions for processing the packet. An order in which to transmit the packet among a plurality of packets is determined. Such determination may be based on a size and a destination of the packet indicated in the metapacket. Once this determination is made, the packet is constructed, and operations on the packet are processed to produce a processed packet based on instructions indicated in the descriptor. The processed packet is then transmitted toward the destination.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 11A-E are diagrams illustrating commands and packet movement through a model branch.

FIGS. 12A-B illustrate model network topologies for packet shaping.

DETAILED DESCRIPTION

A description of example embodiments of the invention follows.

Figure 1:
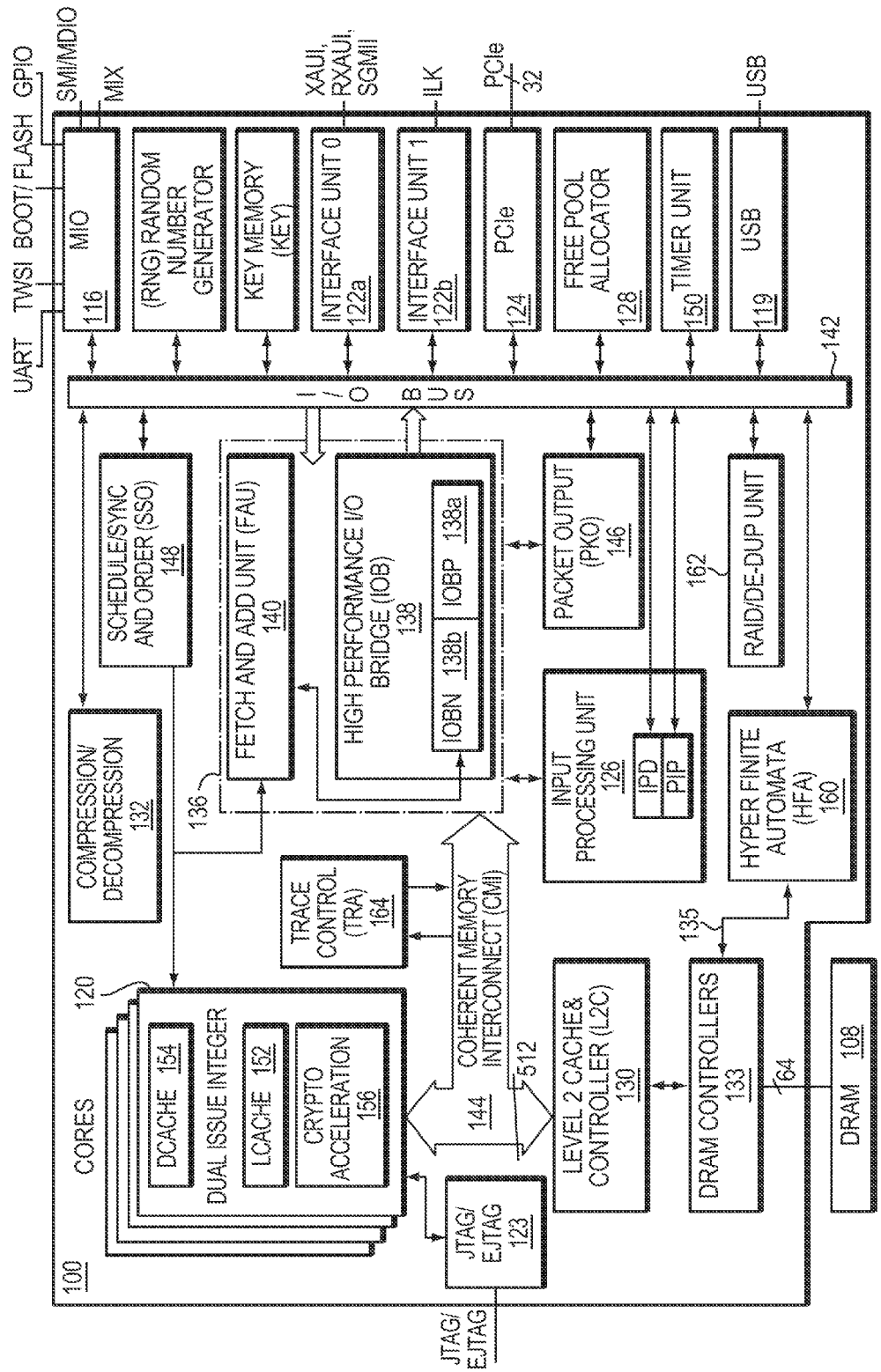
FIG. 1 is a block diagram illustrating a network services processor in which embodiments of the present invention may be implemented.

FIG. 1 is a block diagram illustrating a network services processor 100. The network services processor 100 delivers high application performance using at least one processor core 120.

The network services processor 100 processes Open System Interconnection network L2-L7 layer protocols encapsulated in received packets. As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

A packet is received for processing by a plurality of interface units 122. A packet can also be received by a PCI interface 124. The interface unit 122 performs pre-processing of the received packet by checking various fields in the L2 network protocol header included in the received packet and then forwards the packet to a packet input unit 126. At least one interface unit 122a can receive packets from a plurality of X Attachment Unit Interfaces (XAUI), Reduced X Attachment Unit Interfaces (RXAUI), or Serial Gigabit Media Independent Interfaces (SGMII). At least one interface unit 122b can receive connections from an Interlaken Interface (ILK).

The packet input unit 126 performs further pre-processing of network protocol headers (e.g., L3 and L4 headers) included in the received packet. The pre-processing includes checksum checks for TCP/User Datagram Protocol (UDP) (L3 network protocols).

A free-pool allocator 128 maintains pools of pointers to free memory in Level-2 cache memory 130 and external DRAM 108. The packet input unit 126 uses one of the pools of pointers to store received packet data in Level-2 cache memory 130 or external DRAM 108 and another of the pools of pointers to allocate work queue entries for the processor cores 120.

The packet input unit 126 then writes packet data into buffers in Level-2 cache 130 or external DRAM 108. Preferably, the packet data is written into the buffers in a format convenient to higher-layer software executed in at least one of the processor cores 120. Thus, further processing of higher level network protocols is facilitated.

The network services processor 100 can also include one or more application specific co-processors. These co-processors, when included, offload some of the processing from the cores 120, thereby enabling the network services processor to achieve high-throughput packet processing. For example, a compression/decompression co-processor 132 is provided that is dedicated to performing compression and decompression of received packets. Other embodiments of co-processing units include the RAID/De-Dup Unit 162, which accelerates data striping and data duplication processing for disk-storage applications.

Another co-processor is a Hyper Finite Automata (HFA) unit 160 which includes dedicated HFA thread engines adapted to accelerate pattern and/or signature matching necessary for anti-virus, intrusion-detection systems and other content-processing applications. Using a HFA unit 160, pattern and/or signature matching is accelerated, for example being performed at rates upwards of multiples of tens of gigabits per second. The HFA unit 160, in some embodiments, could include any of a Deterministic Finite Automata (DFA), Non-deterministic Finite Automata (NFA), or HFA algorithm unit.

An I/O interface 136 manages the overall protocol and arbitration and provides coherent I/O partitioning. The I/O interface 136 includes an I/O bridge 138 and a fetch-and-add unit 140. The I/O Bridge includes two bridges, an I/O Packet Bridge (IOBP) 138a and an I/O Bus Bridge (IOBN) 138b. The I/O Packet Bridge 138a is configured to manage the overall protocol and arbitration and provide coherent I/O portioning with primarily packet input and output. The I/O Bus Bridge 138b is configured to manage the overall protocol and arbitration and provide coherent I/O portioning with primarily the I/O Bus. Registers in the fetch-and-add unit 140 are used to maintain lengths of the output queues that are used for forwarding processed packets through a packet output unit 146. The I/O bridge 138 includes buffer queues for storing information to be transferred between a coherent memory interconnect (CMI) 144, an I/O bus 142, the packet input unit 126, and the packet output unit 146.

The miscellaneous I/O interface (MIO) 116 can include auxiliary interfaces such as General Purpose I/O (GPIO), Flash, IEEE 802 two-wire Management Interface (MDIO), Serial Management Interrupt (SMI), Universal Asynchronous Receiver-Transmitters (UARTs), Reduced Gigabit Media Independent Interface (RGMII), Media Independent Interface (MII), two wire serial interface (TWSI) and other serial interfaces.

The network services provider 100 may also include a Joint Test Action Group ("JTAG") Interface 123 supporting the MIPS EJTAG standard. According to the JTAG and MIPS EJTAG standards, a plurality of cores within the network services provider 100 will each have an internal Test Access Port ("TAP") controller. This allows multi-core debug support of the network services provider 100.

A Schedule/Sync and Order (SSO) module 148 queues and schedules work for the processor cores 120. Work is queued by adding a work queue entry to a queue. For example, a work queue entry is added by the packet input unit 126 for each packet arrival. A timer unit 150 is used to schedule work for the processor cores 120.

Processor cores 120 request work from the SSO module 148. The SSO module 148 selects (i.e., schedules) work for one of the processor cores 120 and returns a pointer to the work queue entry describing the work to the processor core 120.

The processor core 120, in turn, includes instruction cache 152, Level-1 data cache 154, and crypto-acceleration 156. In one embodiment, the network services processor 100 includes 32 superscalar Reduced Instruction Set Computer (RISC)-type processor cores 120. In some embodiments, each of the superscalar RISC-type processor cores 120 includes an extension of the MIPS64 version 3 processor core. In one embodiment, each of the superscalar RISC-type processor cores 120 includes a cnMIPS II processor core.

Level-2 cache memory 130 and external DRAM 108 are shared by all of the processor cores 120 and I/O co-processor devices. Each processor core 120 is coupled to the Level-2 cache memory 130 by the CMI 144. The CMI 144 is a communication channel for all memory and I/O transactions between the processor cores 100, the I/O interface 136 and the Level-2 cache memory 130 and controller. In one embodiment, the CMI 144 is scalable to 32 processor cores 120, supporting fully-coherent Level-1 data caches 154 with write through. Preferably the CMI 144 is highly-buffered with the ability to prioritize I/O. The CMI is coupled to a trace control unit 164 configured capture bus request so software can later read the request and generate a trace of the sequence of events on the CMI.

The Level-2 cache memory controller 131 maintains memory reference coherence. It returns the latest copy of a block for every fill request, whether the block is stored in Level-2 cache memory 130, in external DRAM 108, or is "in-flight." It also stores a duplicate copy of the tags for the data cache 154 in each processor core 120. It compares the addresses of cache-block-store requests against the data-cache tags, and invalidates (both copies) a data-cache tag for a processor core 120 whenever a store instruction is from another processor core or from an I/O component via the I/O interface 136.

In some embodiments, a plurality of DRAM controllers 133 supports up to 128 gigabytes of DRAM. In one embodiment, the plurality of DRAM controllers includes four DRAM controllers, each of the DRAM controllers supporting 32 gigabytes of DRAM. Preferably, each DRAM controller 133 supports a 64-bit interface to DRAM 108. Additionally, the DRAM controller 133 can supports preferred protocols, such as the DDR-III protocol.

After a packet has been processed by the processor cores 120, the packet output unit 146 reads the packet data from the Level-2 cache memory 130, 108, performs L4 network protocol post-processing (e.g., generates a TCP/UDP checksum), forwards the packet through the interface units 122 or the PCI interface 124 and frees the L2 cache memory 130/DRAM 108 used by the packet.

The DRAM Controllers 133 manages in-flight transactions (loads/stores) to/from the DRAM 108. In some embodiments, the DRAM Controllers 133 include four DRAM controllers, the DRAM 108 includes four DRAM memories, and each DRAM controller is connected to a DRAM memory. The DFA unit 160 is coupled directly to the DRAM Controllers 133 on a bypass-cache access path 135. The bypass-cache access path 135 allows the HFA Unit to read directly from the memory without using the Level-2 cache memory 130, which can improve efficiency for HFA operations.

The network services processor 100, as well as any subset of its components described above, may be implemented in hardware, software, firmware, or a combination of such implementation approaches. Embodiments of the present invention may be implemented in the network services processor 100 shown in FIG. 1, and may be directed more particularly to the packet output unit (PKO) 146. Example embodiments are described in further detail below with reference to FIGS. 2-15.

Figure 2:
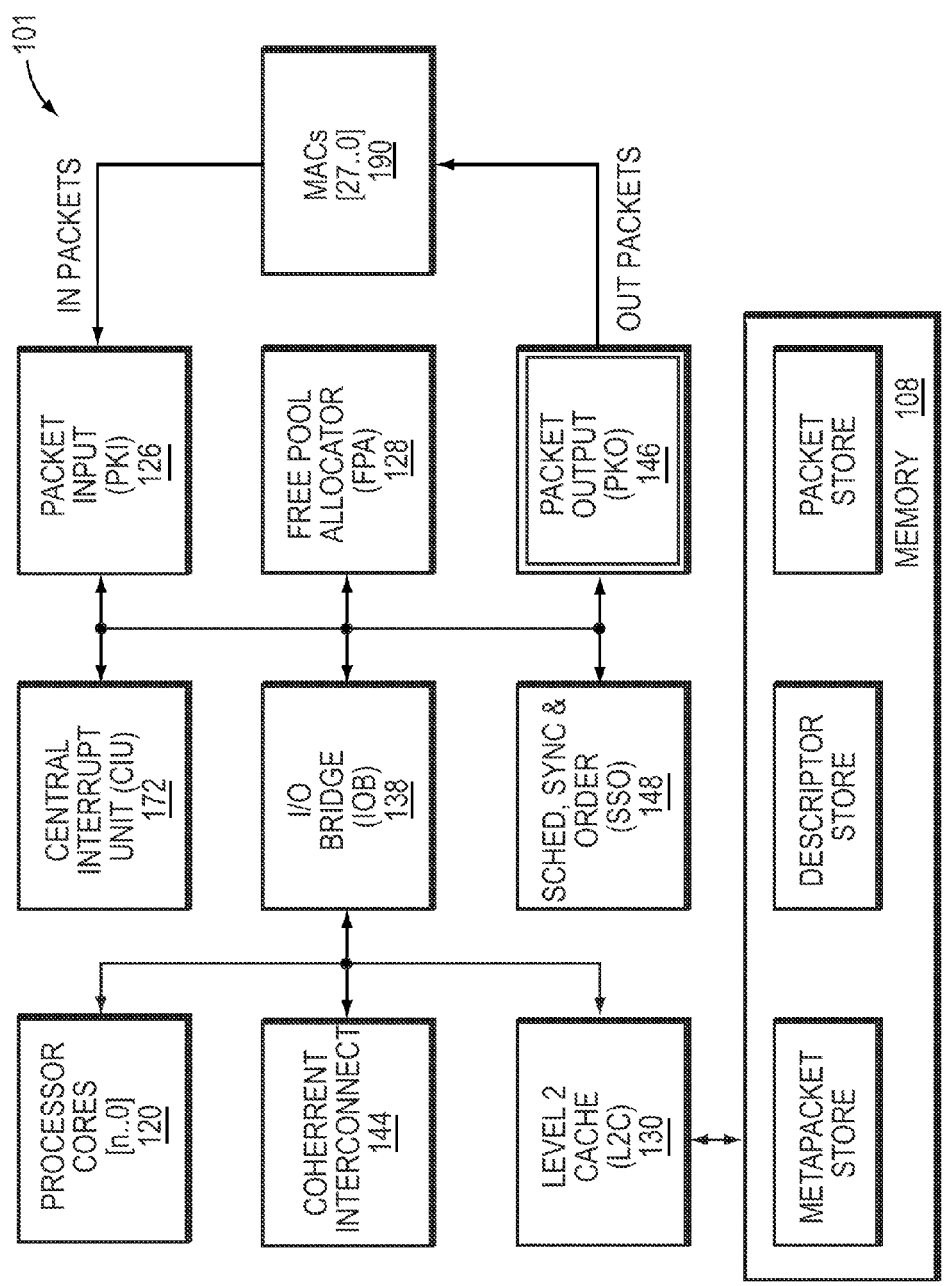
FIG. 2 is a simplified block diagram illustrating a network services processor in which embodiments of the present invention may be implemented.

FIG. 2 is a simplified block diagram of a network services processor 101. The processor is comparable to, and may include some or all of the components of, the processor 100 of FIG. 1. However, the processor 101 is illustrated to highlight the components of the processor 101 that are most relevant to the operations of the PKO 146. In addition to the components of FIG. 1, the processor 101 also includes a central interrupt unit (CIU) 172, which controls operation interrupts at the processor 101. Further, the processor 101 communicates with media access controllers (MACs) 190, which interface with the PKO 146 and PKI 126 and operate to send and receive packets to and from destinations across a network.

Figure 3:
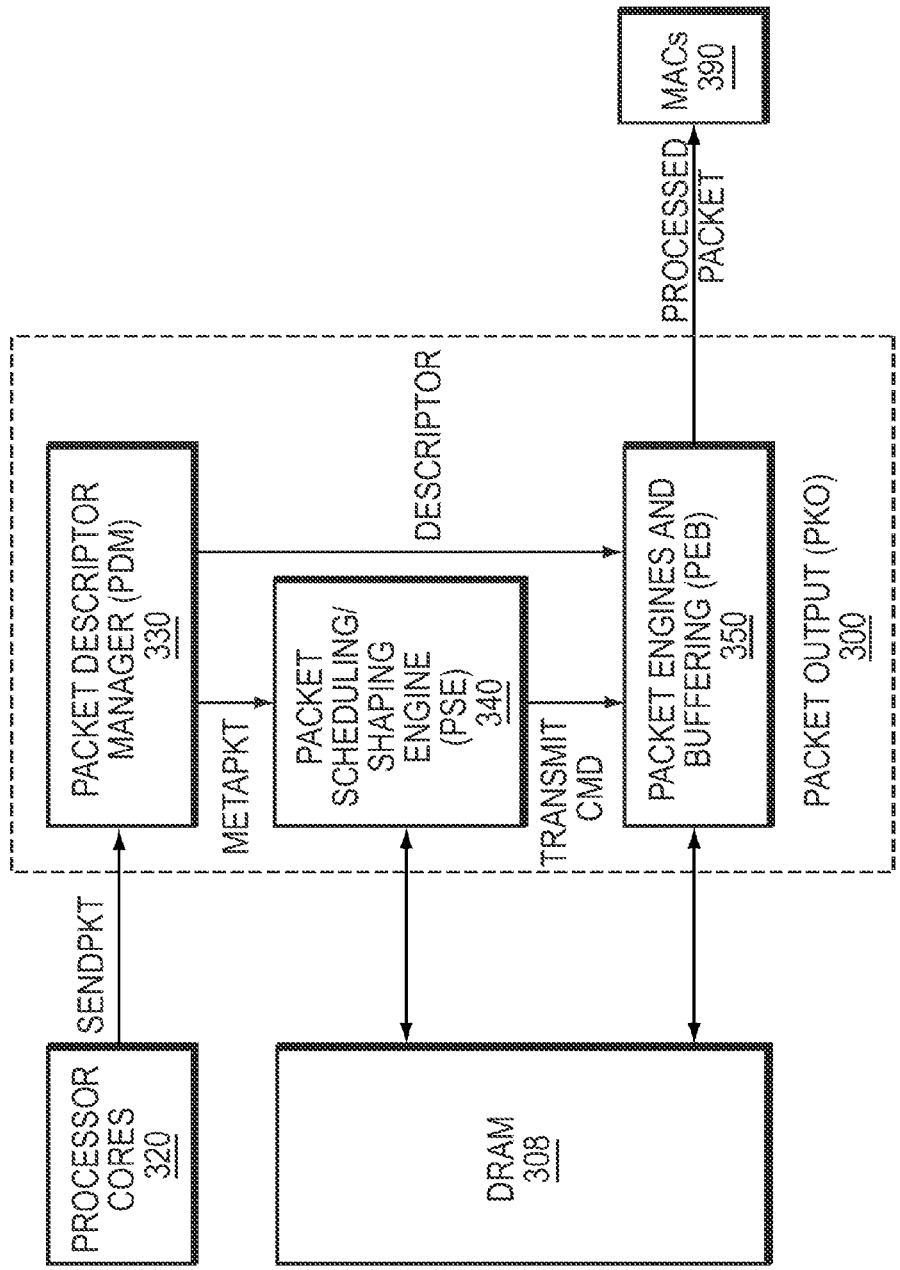
FIG. 3 is a block diagram illustrating a packet output processor (PKO) in one embodiment.

FIG. 3 is a block diagram illustrating a packet output processor (PKO) 300 in one embodiment. The PKO 300 may be implemented in the network processors 100, 101 described above with reference to FIGS. 1 and 2. The PKO 300 may include a packet descriptor manager (PDM) 330, a packet scheduler and shaping engine (PSE) 340, and a packet engines and buffering unit (PEB) 350). The PKO 300 communicates with processor cores 320 to receive a "send packet" (referred to below as "sendpkt") commands for each packet to be output to the MACs 390. Each sendpkt command may correspond to a given packet, and may identify segments of the memory 308 at which the given packet is stored, as well as instructions for processing the packet. From each sendpkt command, the PKO 308 determines an order in which to transmit the packet relative to other packets, constructs the packet from the memory 308, processes the packet according to instructions provided by the command, and forwards the processed packet to the MACs 390 for transmission to a destination across a network.

The PDM 330 may be configured to generate metapackets and descriptors based on received sendpkt commands, manage packet descriptor and metapacket queues, and manage the read and write prefetch buffers that hold the head and tail cache-lines for each queue. Metapackets generally provide information for retrieving and ordering the packet, and may include information such as the size of the packet, destination of the packet, and other characteristics and instructions for ordering the packet. An example metapacket is described below with reference to FIGS. 5A-B. Descriptors generally provide information for processing the packet, and may include information such as pointers indicating addresses of a memory storing the packet, as well as instructions for processing the packet. An example descriptor is described below with reference to FIG. 6.

The PSE 340 may generally operate to determine the relative order in which to transmit each packet. To make this determination, the PSE 340 may utilize each metapacket to model transmission of each packet through a model network topology. Once the order of a packet is determined, the PEB 350 may perform processing operations on the packet based on instructions indicated in the descriptor, producing a processed packet for forwarding to the MACs 390.

An example operation of the PKO 300 is described below with reference to FIG. 4, with more detailed operations described below with reference to FIG. 7.

Figure 4:
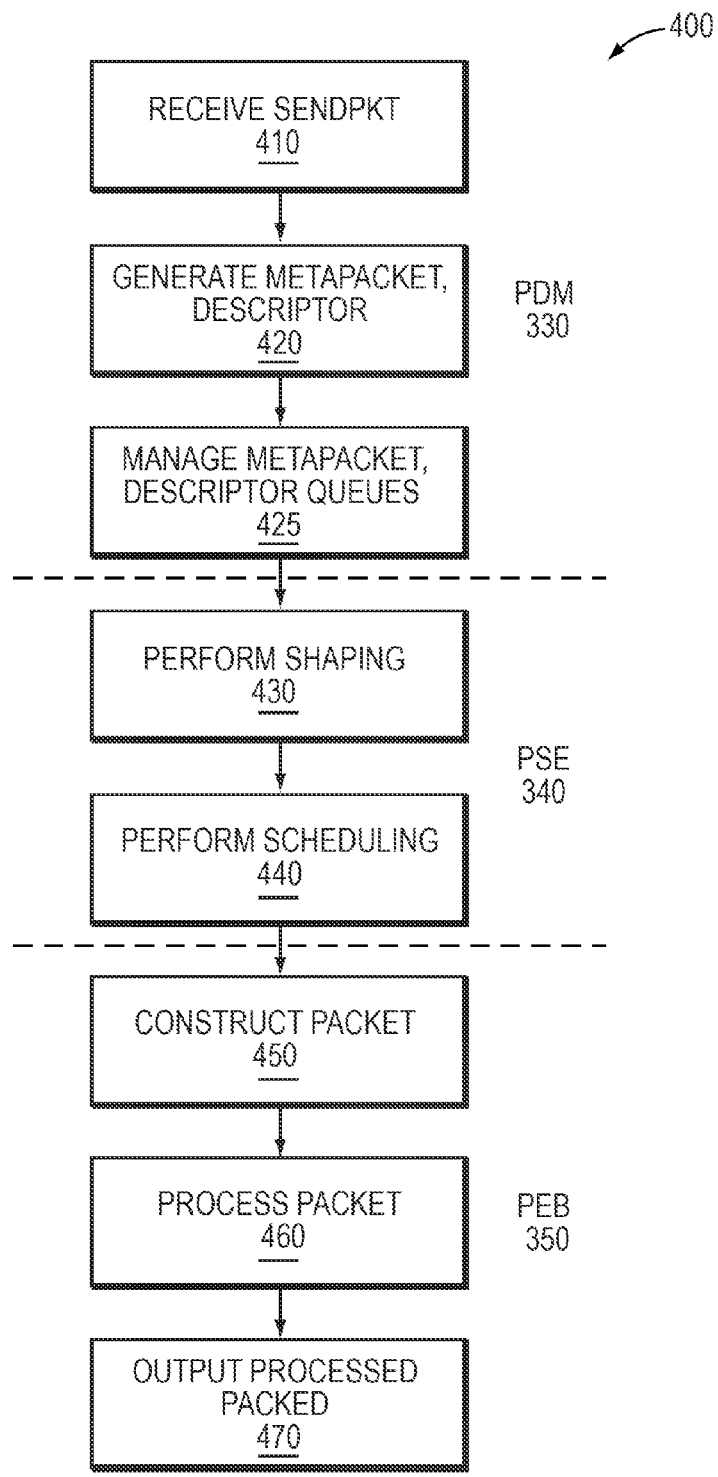
FIG. 4 is a flow diagram illustrating a process of processing a packet by a PKO in one embodiment.

FIG. 4 is a flow diagram illustrating a process 400 of processing a packet by a PKO in one embodiment. With reference to FIG. 3, as sendpkt commands are posted to the PKO 300 (410), the PDM 330 may allocate memory 308 and generate corresponding packet descriptors and metapackets (420), writing each into their respective buffers (425). Packet descriptor buffers may be linked together to form a packet descriptor queue (PDQ), while metapacket buffers may be linked together to form a metapacket queue (MPQ). The PDM 330 may maintain the head and tail pointers for each of these queues for every active flow in the PKO 300. The PDM 330 reads descriptors and metapackets from the linked buffers in cache-line sized blocks and stores them in prefetch RAM internal to the PDM. The individual metapackets are provided to the PSE 340, which determines a time to schedule the packet for transmission. When the PSE 340 determines a specific packet is ready to transmit to the MACs 390, the packet descriptors are provided to PEB 350, which retrieves and processes the packet, sending the processed packet to the MACs 390 for transmission to a target destination.

The PSE 340 may be configured to determine which packet to transmit next for each active link on the device. In particular, this order of packets may be determined by the operations of packet shaping (430) and packet scheduling (440). The PSE 340 may be an event-driven system, servicing events that indicate changes to queue and shaper state. The PSE 340 performs the calculations and checks necessary in order to determine the next packet to transmit at each level of the scheduling and shaping hierarchy and update queue and shaper state accordingly.

The PEB 350 may be configured to construct the packet (450) and execute the instructions contained in the packet descriptor and any extended structures pointed to by the descriptor (using, e.g., a jump instruction) (460), before forwarding the processed packet for transmission to a destination (470). The PSE 350 may issue read transactions in order to walk the buffer chain or gather segments for each packet. State information issued by the PEB 350 may be used to control a cyclic redundancy check (CRC) generator, barrel shifters, insertion and marking logic plus storage of the packet into FIFO for transmission. Operational states of the PEB 350 may be saved and restored as data blocks belonging to different packets are returned from memory, processed and stored. Instructions in the descriptor may also prompt the PEB 350 to issue atomic operations to locations in the memory 308 and post short-form "add work" commands to the SSO after the completion of the packet transfer. Packets may be fetched in fixed (e.g., 128-byte) blocks, and the PEB 350 may have multiple requests outstanding at one time up to a fixed maximum (e.g., 32).

Figure 5A:
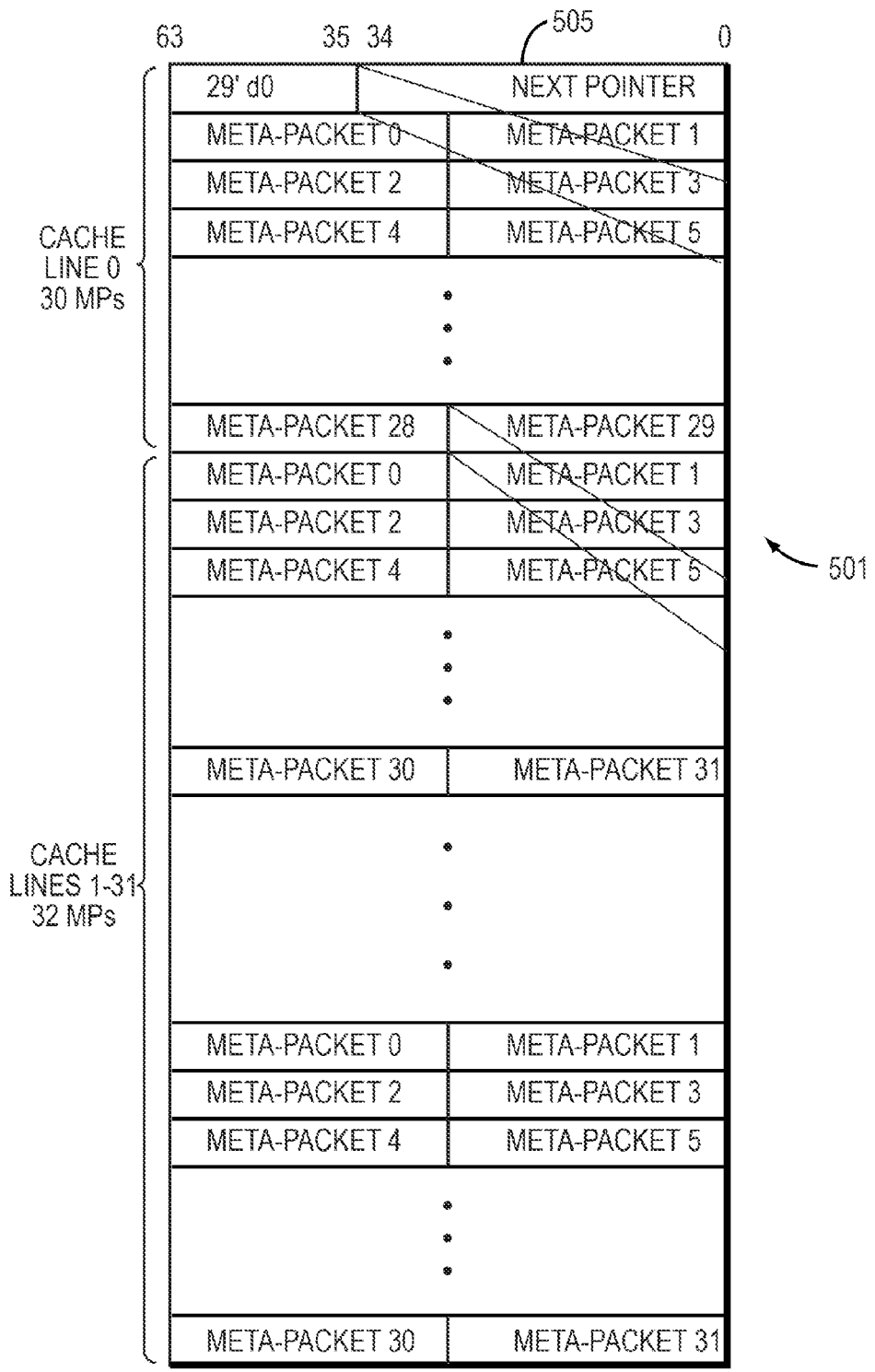
FIGS. 5A-B are block diagrams of a metapacket and a memory space allocated for storing metapackets.
Figure 5B:
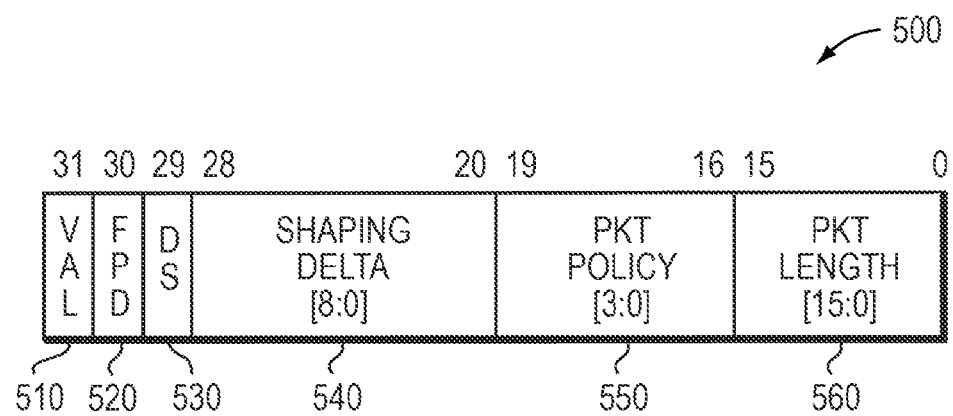

FIGS. 5A-B illustrate metapackets in an example embodiment. Referring first to FIG. 5A, a configuration of a memory space allocated to store metapackets is shown. The allocation includes an ordered block of metapackets 501, which may be grouped into one or more groups for addressing by the PKO. In a configuration where a number of memory segments are chained to store metapackets, the allocation may also include a "next pointer" 505, which indicates the memory address of the next allocation.

FIG. 5B is a block diagram of an example metapacket 500. As described above, the metapacket 500 may be constructed by the PDM 330 (FIG. 3) using the information provided in the sendpkt command received from the processor cores. Metapackets may contain the total length of the packet (pkt length) 560 in bytes, which can be used to fetch the packet from memory. This length can be combined with a signed shaping value (shaping delta) 540 to create the shaping length of the packet, which can be used for all scheduling and shaping credit calculations by the PSE 340. The metapacket may also contain a per-packet state (pkt policy) 550 for overriding the queue level packet policy settings. This setting allows the PKO 300 to identify on a packet-by-packet basis any exceptions to the general policy rules established at queues. For example, a control packet may be set to have a "send on RED" policy, which overrides any "stall on RED" policy set up at the queue level. This setting would allow the packet to be sent into the network with minimal latency unaffected by shaping rules which delay the normal data plane traffic. There may also be an "exclusion" flag, which allows the packet to be transmitted without affecting any credit calculations. The flag excludes the packet from being accounted for in the bandwidth assigned to a flow and allows the flow to not be penalized for carrying packets that were not requested or utilized by the endpoint.

The metapacket 500 may include other configurable settings, such as a valid flag (VAL) 510 to indicate validity, a descriptor locator (FPD) 520 for identifying a location of a corresponding descriptor, and a don't send flag (DS) 530 to indicate whether to send the associated packet.

Figure 6:
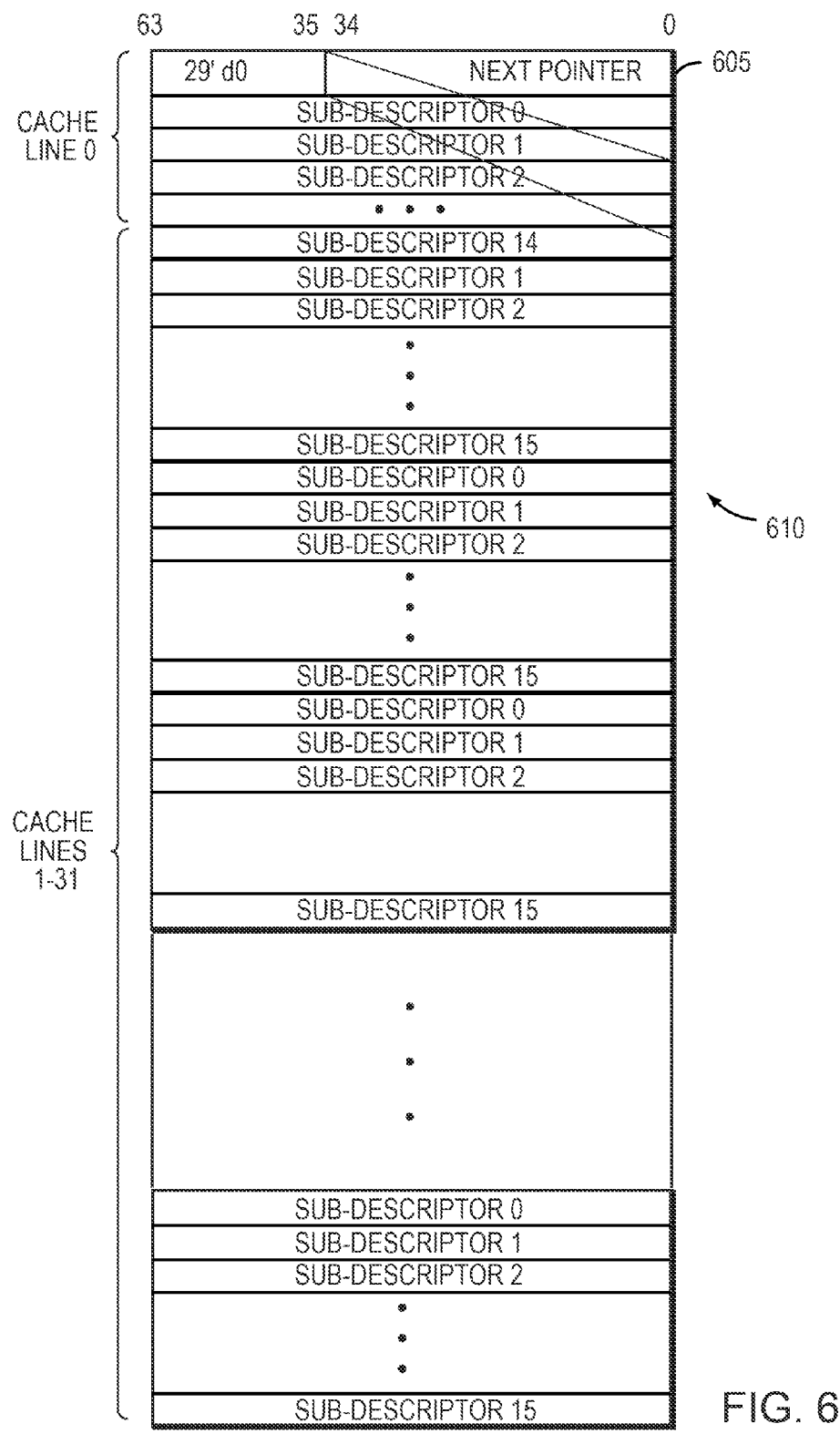
FIG. 6 is a block diagram of a memory space allocated for storing descriptors.

FIG. 6 is a block diagram of a memory space allocated to store packet descriptors 610. Packet descriptors 610 may be constructed from the header information and instructions provided by the sendpkt command. Packet descriptors 610 may have a fixed or maximum size (e.g., 128 bytes) may be and aligned on a fixed (e.g., 128 byte) address. Descriptors 610 may be stored into fixed (e.g., 4 Kbyte) buffers allocated from the FPA. Each buffer may hold a range (e.g., 25 to 200) of packet descriptors, length/policy sub-descriptors and a link to the next buffer in the chain 605 in the event that multiple buffers are chained. The 4 KB buffer size provides a predefined array of descriptors whose addresses can be easily computed to enable pipelined accesses. The inclusion of the sub-descriptors in the same buffer as the packet descriptors allows the PKO 300 to use the same head and tail pointers to track each array. Minimal (e.g., 7-bit) offsets may be required to identify the head and tail of the sub-descriptor array.

Figure 7A:
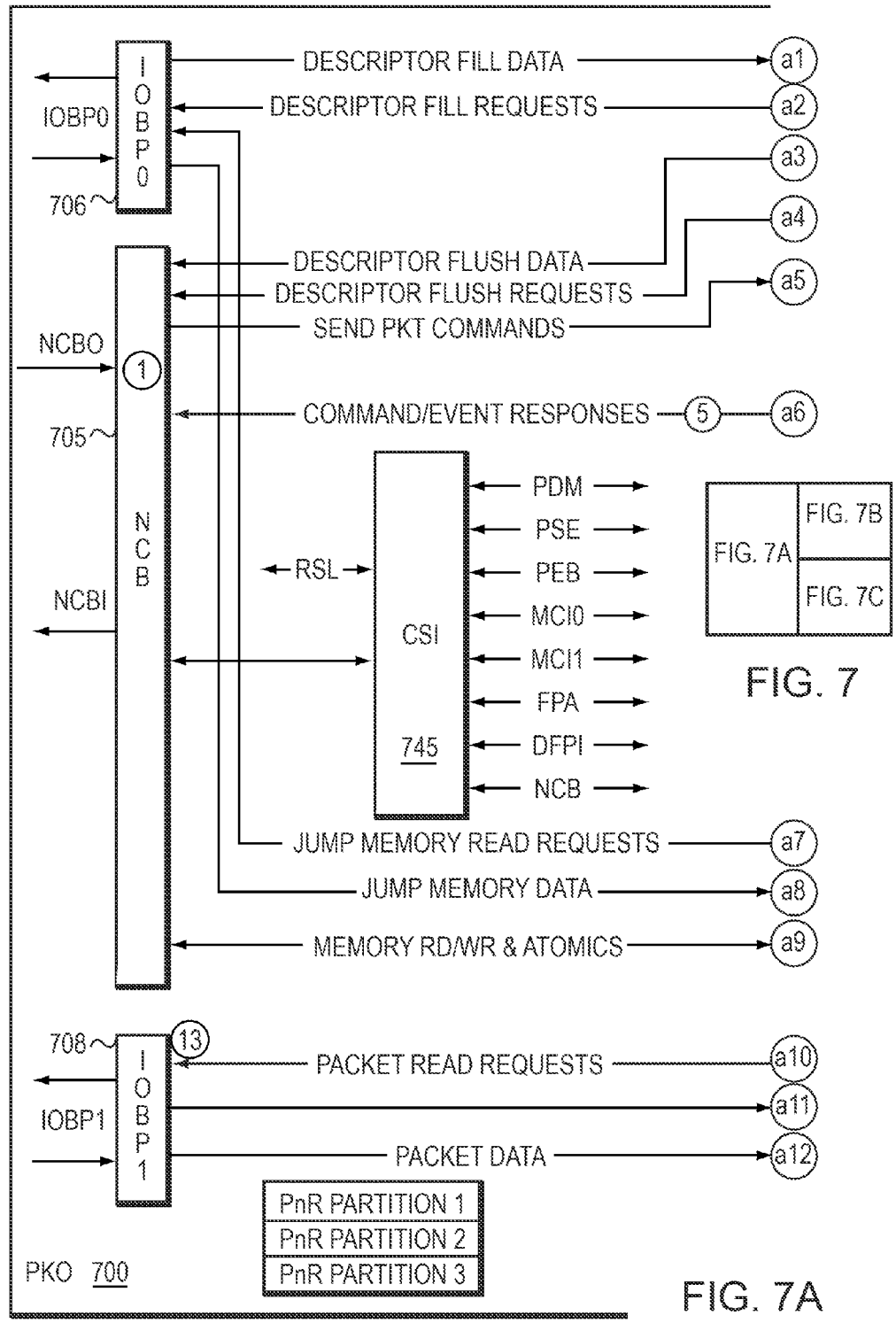
FIG. 7 is a detailed block diagram of a PKO in one embodiment.
Figure 7B:
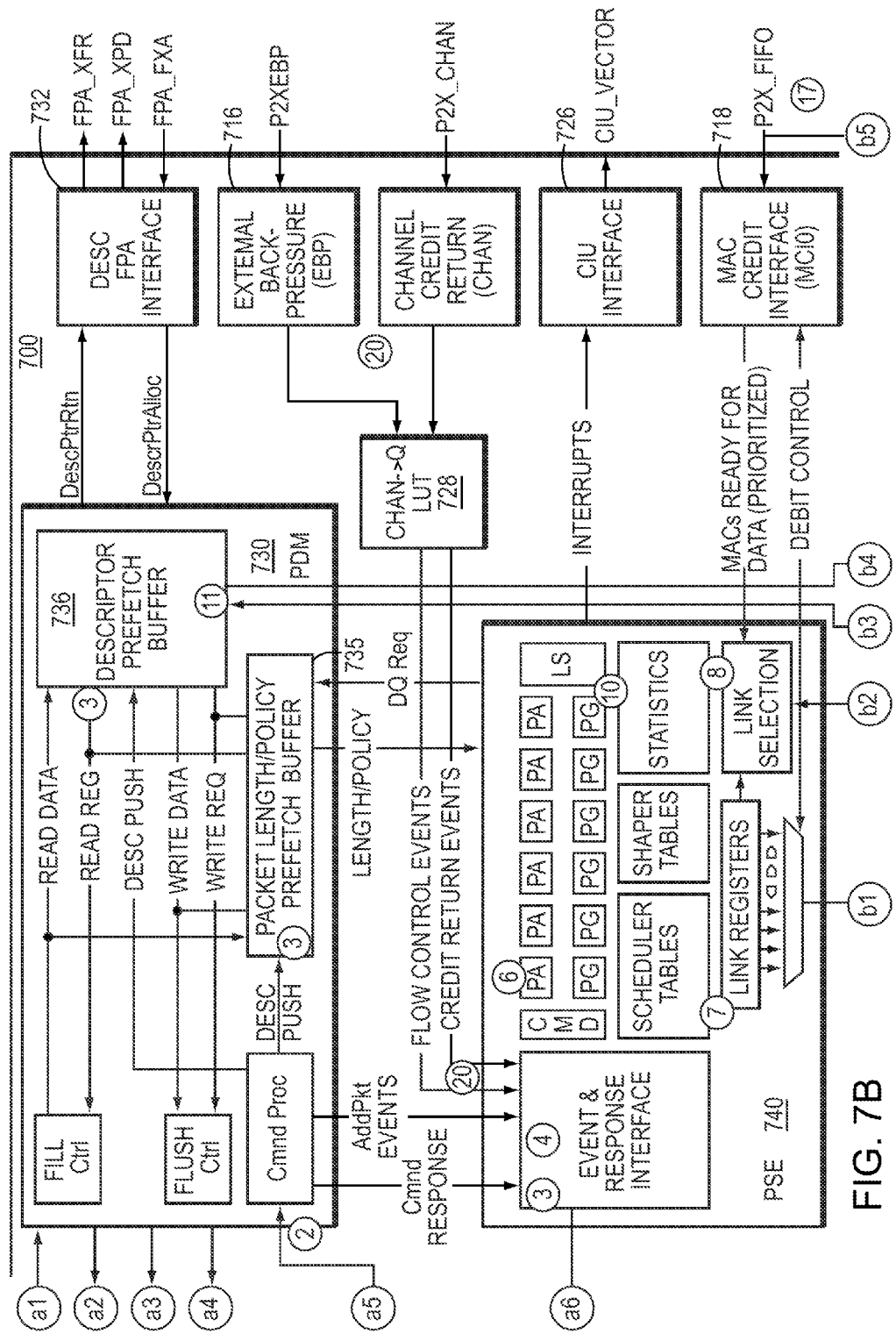
Figure 7C:
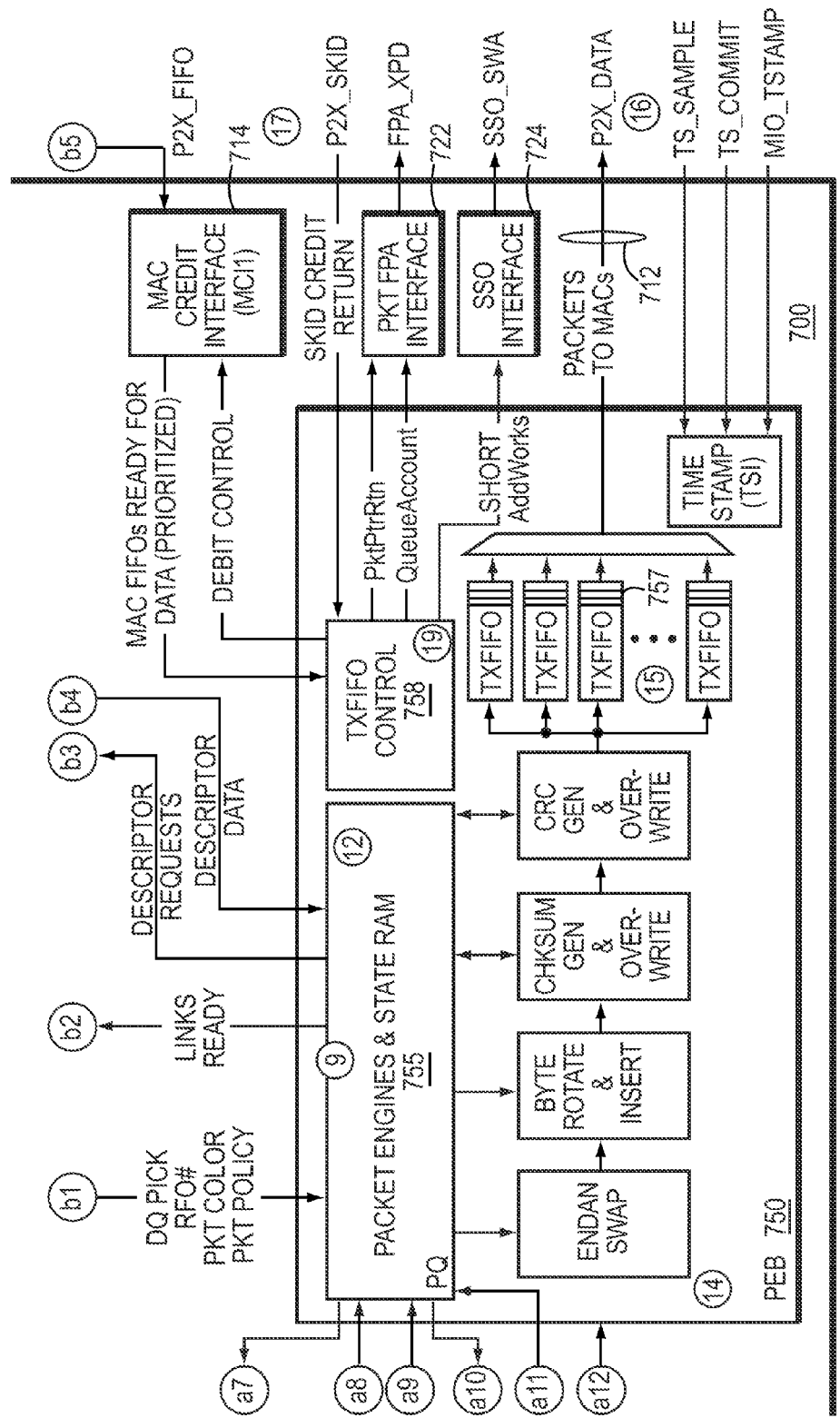

FIG. 7 is a detailed block diagram of a PKO 700 in one embodiment. The PKO 700 may be configured comparably to the PKO 300 described above with reference to FIG. 3, including a PDM 730, PSE 740 and PEB 750. Further, several additional components, which provide for ordering, constructing and processing the packets, as well as interfacing with external modules, are illustrated and described below, along with their implementation in an example process of ordering, processing and forwarding a packet.

The net control buffer (NCB) 705 may include an interface to provide a control plane conduit to the PKO 700. Configuration and commands are received by the PKO from the processor cores (e.g., processor cores 320 in FIG. 3) via the NCB 705 interface. The NCB 705 may further connect the PKO 700 to main memory that supports store operations. Thus, all packet descriptor stores from the PDM 730, command responses from the PSE 740 and atomic operations to memory from the PEB 750 may all be serviced by the NCB 705.

The IOBPs 706, 708 include interfaces (e.g., 128-bit interfaces) to the IOBC block which is the bridge to the Coherent Memory Bus (CMB). The IOB0 interface handles fill operations from the PDM 730 as well as context fetches from the packet engine 755 in the PEB 750 as a result of JUMP instructions embedded in packet descriptors. The IOBP1 interface logic takes packet buffer addresses and transfer size information from the packet engine 755 and fetches the packet data from main memory. The returned packet data is buffered and presented to the PEB. The packet data is processed by the engine and stored into a FIFO associated with the target MAC. These interfaces 706, 708, along with the NCB 705, may be run concurrently to overlap command, descriptor and packet transfers.

The MAC Packet Interface 712, also referred to as the P2X_DATA bus, moves the output packet from PKO to a MAC for transmission out of the chip. The bus may be 128 bits wide. The MAC buffer credit interface 714 implements a credit system that prevents the MACs transmit buffers from overflowing.

The MAC external backpressure interface 716 may be used to transfer xon/xoff channel status from the MACs to the PKO 700. Each MAC may send n-bits of xon/xoff information per cycle to the PKO 700 and over an 8 cycle period the status of all the supported channels are reported. The interface logic in the PKO detects changes in the xon/xoff (channel on/off) state for each channel, maps the channel to a specific PKO queue number, and then generates a FlowCtl(Q,Xoff) command, which is sent to the PSE 740 for processing.

In addition to external interfaces providing flow control, software controlling the PKO 700 can directly set the xon/xoff state for each queue via the NCB 705 based access to the appropriate fields in the scheduler table. Each scheduler table entry may contain a pair of xoff flags, one for hardware and one for software. If either of these xoff flags is set, then the queue is flow controlled.

The MAC channel credit interface 718 may handle the return of credits from the MACs (e.g., MACs 390 in FIG. 3), which are used to limit the amount of data that is in-flight to any specific channel. When external backpressure is applied by a downstream device, the amount of data that it can accept before transmission actually stops is finite. The credits can prevent more data from being queued to the channel than the device at the far-end of the link can absorb once it signals xoff.

The PKO 700 receives a (e.g., 4-bit) bus from each of the two MACs, and (e.g., 2-bit) serial busses from the DPI block and all MACs. Each serial interface sends 16-bit words containing a "100" start sequence, the channel number, the number of credit words being returned on that channel and an EOP flag.

The MACs return credit as packet data is transmitted off-chip. These updates may be frequent and can return a range (e.g., from 1 credit (16 bytes) to 16 credits (256 bytes)) per update. The PKO 700 may map the link and channel to a specific queue and a "creditrtn (Q,credit,eop)" event may be generated and sent to the PSE 740. The running total for the available channel credit may be kept as part of the channel queue state in the scheduler RAM. The creditrtn event may be used to add credit to this total. When a channel queue's credit is greater than the size of the next packet to send, it is enabled for transmitting. Packets are selected for transmission from this queue, the packet length is subtracted from the total. Should the total value fall below the size of the next packet to send then the queue is disabled from transmitting.

The PKO 700 may use the descriptor FPA interface 732 to allocate and free memory buffers for descriptors and metapackets, and may use the packet FPA interface 722 to free memory buffers that were previously allocated for one or more packets. The PKO 700 may use the SSO interface 724 to schedule work to a processor core.

The PKO 700 may generate high and low water interrupts for each active descriptor queue (DQ) and on a per-packet basis as instructed by the packet descriptor. The PKO 700 may also generate interrupts for ECC errors and for several types of hardware (HW) faults. These interrupts can be transferred to an external CIU block (e.g., CIU 172 in FIG. 2) through the PKO's CIU interface 726.

The control/status interface (CSI) block 745 may interface to both the NCB 705 and RSL busses and provide the access and arbitration point for these interfaces to read and write to control/status registers (CSRs) at the PKO 700. The CSI 745 may include dedicated registers and also extend into the PKO 700 to allow debug access to state registers and memories contained in the other blocks. Registers and memories accessible via the NCB 705 or RSL buses may be read and write accessible, and CSRs with side-effects may have aliased addresses that allow for access without side-effects.

A PKO command interface may be an allocated (e.g., 128 byte) memory-mapped region of the NCB 705 address space, at which the processors (e.g., processor cores 320 in FIG. 3) can send commands to configure and manage the PKO 700 resources, as well as to queue packets for transmission out a device link. Each processor may transmit a command of up to a fixed length (e.g., 128 bytes) as a single atomic store to the PKO command buffer. The NCB interface 705 may pass these commands to the PDM 750, where it parses the command and performs the following checks: 1) Check the command is valid. 2) Check the Create command targets a queue that is unused and descriptor buffers are available. 3) Check the Remove command targets a queue that is in use. 4) Check the Send command targets a queue that is in use and descriptor buffers are available.

For each command sent to the PKO 700, a response may be expected to be provided back to the processor that issued the command. The command response (e.g., 64-bits) returned to the processor echoes back the received command code and a status code. The status code identifies if the command completed successfully or if an error was encountered. Any command which fails a check is discarded and an optional interrupt generated. In the case of sendpkt commands, a portion (e.g., the lower 48 bits) may contain either the instantaneous DQ depth in bytes or packets depending upon the configuration of the DQ. All other commands return zeroes in this field. Timers in the NCB interface 705 may be utilized to track each command to guard against PKO 700 failure. A command timeout may automatically generate a response back to the appropriate processor by the command interface logic at the NCB 705.

The PDM 730 may also manage the packet descriptor and metapacket prefetch buffers 736, 735. Prefetching may be done for every active DQ in the system in order to reduce latency, conserve DRAM bandwidth, and allow the PSE 740 to pipeline scheduling decisions. The packet lengths can be central to the rate shaping and DWRR credit calculations. In order to achieve the necessary throughput, up to a fixed number (e.g., 32) packet descriptor fetches could be put in flight before the first descriptor is returned to the PKO 700. If the packet length was kept in the descriptor the credit calculations would need to be done assuming a maximum transmission unit (MTU) or some average packet length and then corrected later when the actual packet length is available. One drawback of this approach is that, with so many packets outstanding, the credit calculation error at any given moment can be significant, and the scheduling and shaping decisions derived from these calculations may be incorrect. Another issue is that sometimes corrections to calculations should not be done, such as on the deficit-weighted round robin (DWRR) weight when a queue transitions from active to inactive. This scenario can occur multiple times before the first descriptor is available at the PKO 700. Thus, additional state information would be needed to recall, on a queue-by-queue basis, which packets do and do not generate corrective action. These actions may also require additional events to be processed consuming valuable PSE cycles and scheduling table bandwidth.

In order for the credit calculations to be accurate and avoid these complications, the PKO may require that the exact length of a packet being transmitted be known prior to fetching the descriptor. To accommodate this requirement, the buffers used to store packet descriptors may also contain a small data structure holding the individual lengths of every packet. Each DQ may have two dedicated buffers in the PKO 700 for holding packet lengths. A portion of the packet length/policy prefetch buffer 735 (PLRB), for example, may hold lengths for the first N packets in each DQ, where N is configurable for example as 16, 32 or 64. Likewise, a portion of the descriptor prefetch buffer 736 (PLWB) may be used to pack together packet lengths for burst storage at the tail of each DQ. A packet length can be taken from the PLRB each time the DQ is chosen for transmission and as the buffer drains below the halfway mark the DMU fetches in the next set of N/2 packet lengths. As packets are added to a DQ, the descriptor can be stored to its DDR memory buffer and the packet length is sent to the PLWB. Once N/2 packet lengths are packed into the PLWB, they may be flushed out to DDR memory as a single burst write transaction.

In order to provide substantial throughput (e.g., 100 Mpps) from a single packet queue (PQ) and the fact that these packets can all source from a single DQ in the scheduling tree, each DQ in the tree may be required to be configured for N=64. This configuration would support having 32 packets in-flight from any single DQ and allow it to sustain this level of output. One result of this configuration is that increasing the storage of the DQ packet length buffer may reduce the number of DQs that can be supported. With 64 KB total for packet length storage, setting all DQs to be type 2 would allow a maximum of 256 DQs in the system.

The PKO may also manage two tables, the descriptor queue head table and the tail pointer table, which contain the head and tail pointers for each descriptor queue, plus valid bits. Address bits may remain zero, as descriptor buffers may be allocated from local DDR memory.

Described below is an example workflow process of the PKO 700 as it operates to process a sendpkt command, determine an order of a respective packet, construct and process the packet, and forward the packet for transmission. The numbered operations below correspond to the circled numerals within FIG. 7 to illustrate the location at which each operation occurs.

(1) A sendpkt command is received over the NCB 705 bus from a processor core.

(2) The sendpkt command is forwarded to the PDM 730.

(3) The command logic in the PDM 730 extracts the DQ, packet length and packet policy fields from the sendpkt command and sends them to the packet prefetch buffer 735. The entire sendpkt command is sent to the descriptor prefetch buffer 736.

(4) An addpkt event is sent to the PSE 740.

(5) The PSE 740 updates the DQ depth and issues the sendpkt response to the NCB interface 705 for transmission to the MIPS processor.

(6) If the DQ is empty it is activated and a pktadvance command is issued to the PA state machines at the PSE 740; otherwise, the addpkt terminates. The PA machines advance the packet through the scheduling levels until it is ether blocked or reaches the PQ registers. As the packet advances forward from queue-to-queue, commands are issued to the statistic block to record the transmission in both packets and bytes.

(7) Once a packet has reached a PQ the link staging register (at the PSE 740) associated with the PQ is set valid. The staging register holds all the state information associated with the packet that was selected for transmission. This state information may include the DQ holding the packet, the packet length, color and policy bits, channel number and the PEB 750 FIFO number assigned to the target link.

(8) The link selection logic compares the valid staging registers to the prioritized link status provided by the MCI1 block, the status of any active link shapers and the per link resource status from the PEB 750 and chooses the highest priority, valid link that can be serviced by the PEB 750.

(9) The FIFO number and the packet state from the selected PSE link register are passed to the PEB block 750, where it is queued for processing.

(10) The PSE 740 issues a packetget command to the PG state machines to fill the now empty PQ register. The command works its way from the PQ to the leaf queue of the scheduling tree pulling a packet forward from the next level to backfill the empty queue. It also issues a command to the statistics block to record the packet transmission from each queue as it traverses the scheduling tree. (The process embodied in steps 7 through 10 may be repeated continuously to provide a new packet selection every 12 cycles.)

(11) The packet engine 755 in the PEB 750 issues a request to the descriptor prefetch buffer 736 in the PDM 730 for the packet's descriptor. The request may be done on behalf of the PEB 750 FIFO that has ownership of this packet. The packet engine 755 identifies the requested descriptor by the DQ number and the PEB FIFO number.

(12) The descriptor prefetch buffer 736 returns the descriptor to the packet engine 755 at the PEB 750 if the descriptor is in the buffer, else the engine is told to sleep while the descriptor is fetched from main memory. If a fetch is needed it is issued to the IOBP0 interface 706 and the DQ number is used as the flow ID. Once the descriptor is in the buffer the PEB FIFO is signaled to wake and reissue the descriptor request.

(13) Using the pointer(s) in the descriptor provided from the PDM, the packet engine 755 fetches the packet via the IOBP1 interface 708 on behalf of the PEB FIFO using one or more cache line (128 byte) read transactions. All packet fetch transactions issued for a FIFO use the same flow ID and are guaranteed to complete in order. The flow ID for packet fetch operations is always equal to the PEB FIFO number. When multiple links are being supported multiple FIFOs within the PEB will be contending for the packet engine 755. The packet engine 755 services these FIFOs using a round-robin mechanism.

(14) Using the sub-operations in the descriptor each 128 byte transfer of packet data or "packet segment" is processed by the packet engine 755 and stored into the PEB FIFO 757 associated with the target link along with a PEB created header. Partial state and residual packet data are saved and restored in per FIFO state memory as segments from different packets are received over the IOBP 1 interface and processed by the Packet Engine.

(15) Once a packet is completely fetched, processed, stored and any final updates made, such CRC calculations, the packet engine 755 adds the number of "segments" stored in the FIFO 756 to the packet segment counter associated with the FIFO 756. This action alerts the TX state machine that a packet is queued for transmission to the link. The PEB 750 returns the empty packet buffer(s) to the FPA and provides the packet length in either bytes or number of buffers to the FPA for queue accounting purposes.

(16) A packet is pulled from a specific TX FIFO 756 in segments and sent to the target link over the P2X bus by the TX State machine based on the prioritized link service vector supplied by the MCI1 block 714.

(17) The links provide credit back to the PKO 700 whenever data is pulled from the link's TX FIFO 757 and placed on the line. The BGX links also provide skid credit returns for the small FIFO at the BGX interface which feed the four TX FIFOs internal to the BGX.

(18) Credit counters track the amount of data in-flight and queued for each link. The MCI0 & 1 blocks 714, 718 identify the highest priority link(s) to be serviced based on these counters and provides this information to the Link Selection logic in the PSE and to the TX State machine in the PEB.

(19) The TX State machine 758 in the PEB 750 sends the packet to the target link and once the EOP byte is transferred the PEB issues any optional SSO events, interrupts or memory updates specified in the descriptor. In the case of PTP packets, the PEB 750 may wait for the MAC to assert the timestamp commit line before executing these operations.

(20) Channel level credit returns and channel level backpressure (xon/xoff) status from the MACs are captured by the PKO 700. The LUT 728 translates the channel numbers into PSE queue IDs and posts creditrtn and FlowCtrl events to the PSE.

Packet Scheduling

In order to determine the order in which to transmit packets, a PKO (e.g., PKOs 300, 700 described above with reference to FIGS. 3 and 7) may implement packet shaping and/or packet scheduling. In the examples described above, such shaping and scheduling may be operated by a respective PSE (e.g., PSEs 340, 740). To implement scheduling, the PSE may define a tree data structure to model the topology of the network to which the packets are to be transmitted. Nodes within the tree structure may represent routing points within the network, while packets may be represented by the metapackets described above. The PSE may utilize an algorithm including "push" and "pull" techniques to model the packets advancing through the network topology. The algorithm and data structures may be optimized for efficient storage to and retrieval from memory, and processing supporting a wide variety of hardware processing options. The algorithm and data structures may be configured to support modeling of arbitrarily large networks, including those with a very large numbers of levels and a high fan-in per node.

Figure 8A:
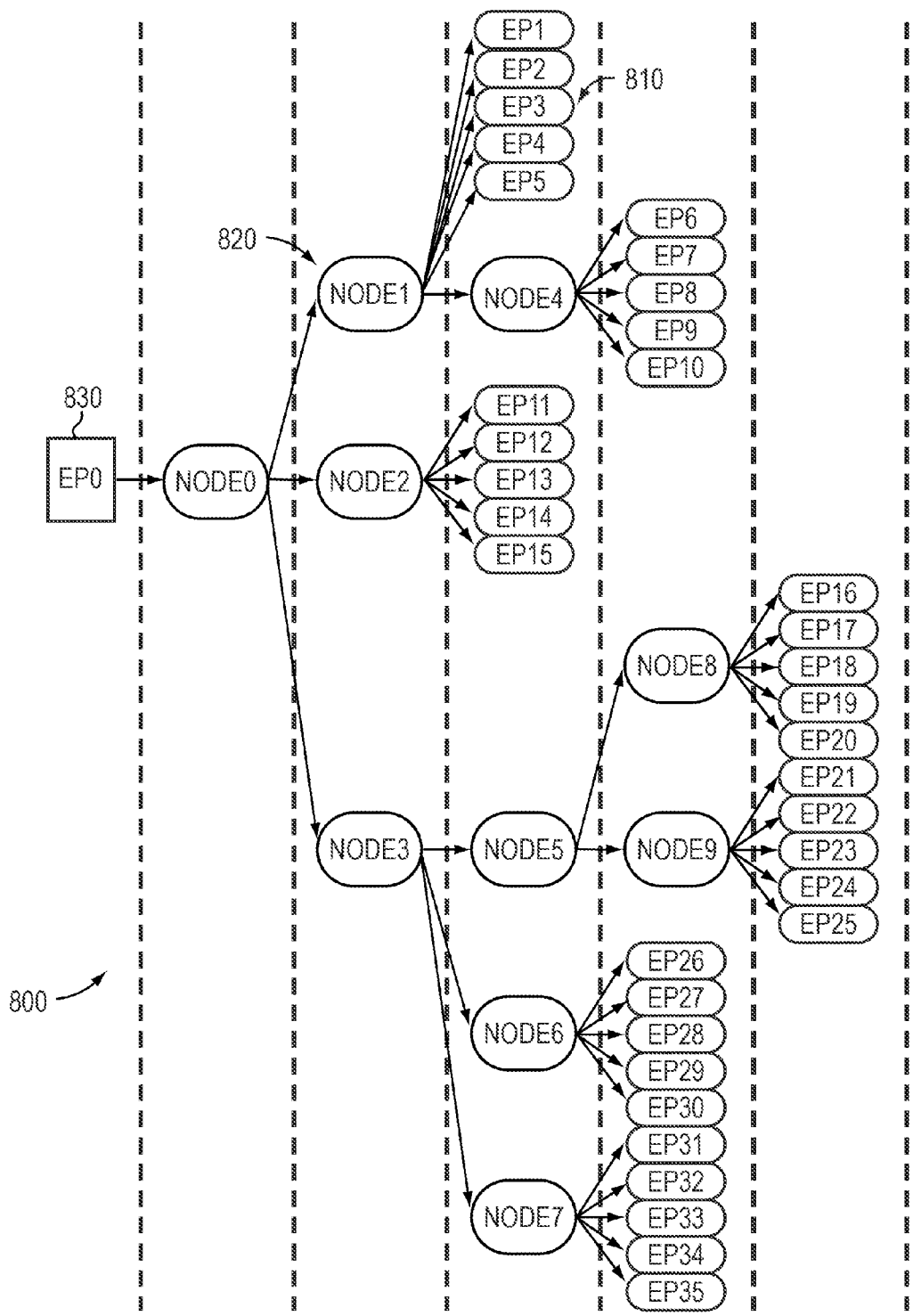
FIGS. 8A-B illustrate model network topologies for packet scheduling.
Figure 8B:
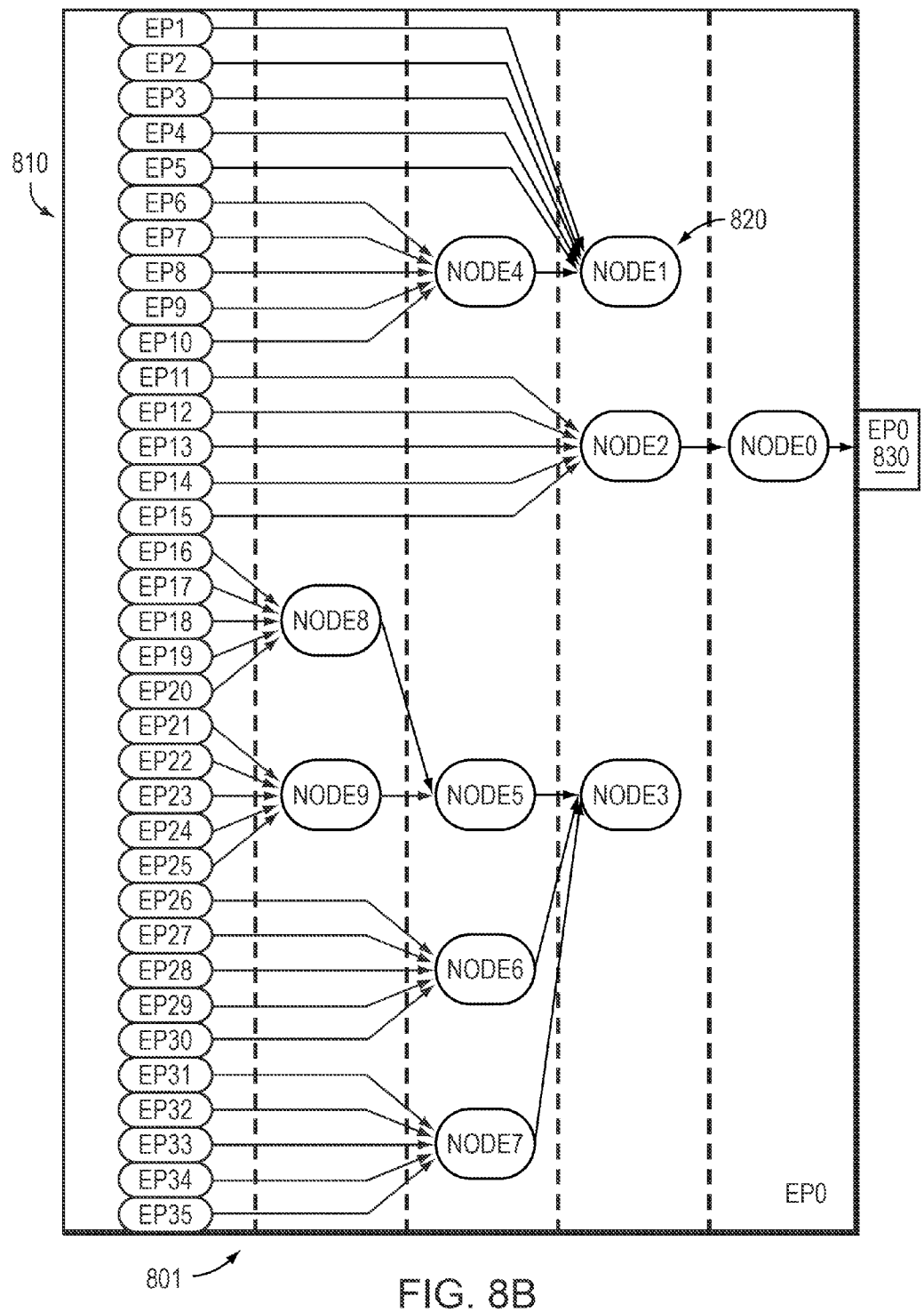

FIGS. 8A-B illustrate model network topologies for packet scheduling. FIG. 8A shows an example model network topology 800 from the viewpoint of the model, i.e., the end point hosting the PKO, shown as EP0 830. EP0 830 is able to send packets to a number of other endpoints 810 (labeled EP1-EP35), through the set of intermediate nodes 820 (labeled Node0-Node9). To the PKO at the leftmost node 830, the network topology appears as a tree structure, with the PKO at the root. Branches in the tree represent the physical paths that packets traverse through the network to reach the other endpoints. In this view, EP0s transmitted packets flow up the tree through branches and eventually reach the leaves which are the other endpoints.

A metapacket, as described above with reference to FIG. 5B, may contain the information about a packet essential for its modeling. The format of this information may be optimized for storage to and retrieval from memory. A metapacket may include 1) the length of the associated packet, 2) a reference to the endpoint to which the packet will be transmitted to, 3) a bit signifying whether or not the metapacket is valid, and 4) a bit signifying whether or not the metapacket is a bubble. Bubble metapackets may be advanced through the model, in lieu of valid metapackets, in some cases when there are no other valid metapackets to send. The metapacket may also include custom information supporting specialized mechanisms for selecting the next packet to transmit such a network traffic scheduling and shaping.

FIG. 8B illustrates a model network topology 801 that is reversed in order (i.e., a mirror image) from the topology 800 shown in FIG. 8A. For the purposes of selecting which packet is transmitted next into the network, the model topology shown in FIG. 8A may be implemented. In this model, the endpoint (EP0s 810) transmitted packets flow down the tree from the leaves, through branches and eventually reach the root 830. Node0 may be the root node associated with the PKO (where the endpoint EP0 830 represents the hardware encompassing the PKO itself), and Node1, Node2 and Node3 are its children. Node4, in turn, is a child of Node1. Child packet streams aggregate into parent traffic streams until they reach the root node at which point, the packet stream that comes out of the root node is transmitted into the network.

Each node 820 in the model 801 may maintain a record that specifies how it fits into the network topology. This record may include 1) a bit signifying whether or not the node is enabled, 2) a parent node reference, 3) a reference to the first child node in a list of child nodes, 4) references to next and previous nodes for use by the parent's child list, and 5) a number of status bits. Each node 820 may also have storage for a metapacket, and may be limited to storing one metapacket at a time. This metapacket may be referred to as the node's result, and it represents the next packet that will be output by the node 820. In the model, to simulate outgoing packet traffic, metapackets may only move forward, or advance, toward the root 830; they may not move backwards. The root node's result represents the next packet that will be transmitted into the network.

Figure 9A:
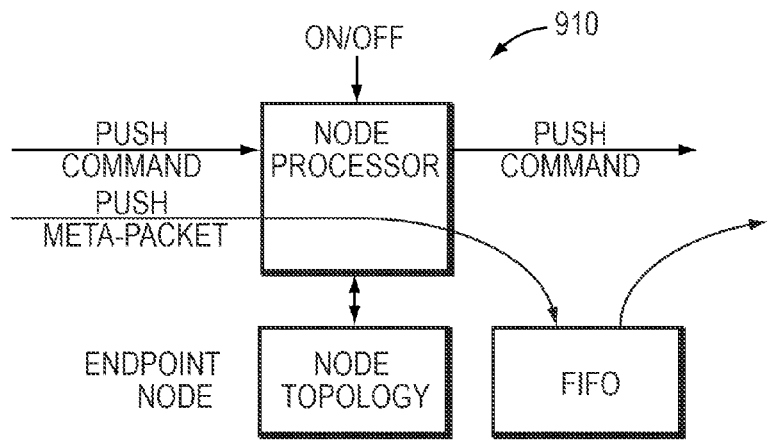
FIGS. 9A-C are block diagrams of model nodes.
Figure 9B:
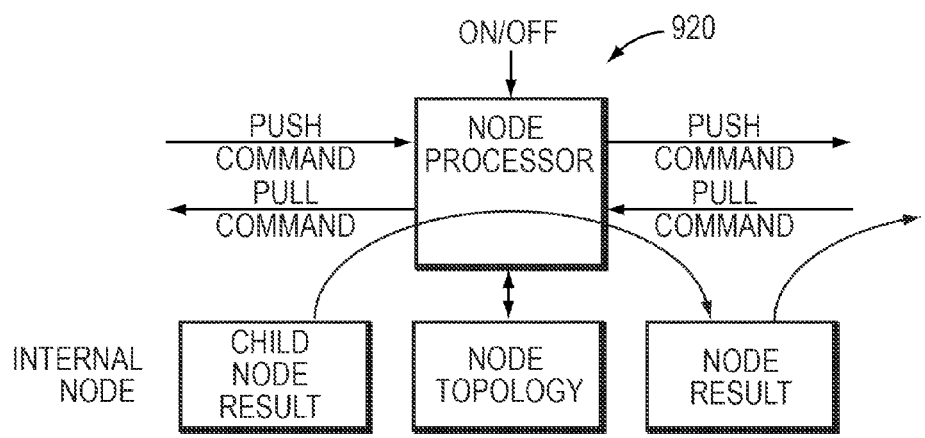
Figure 9C:
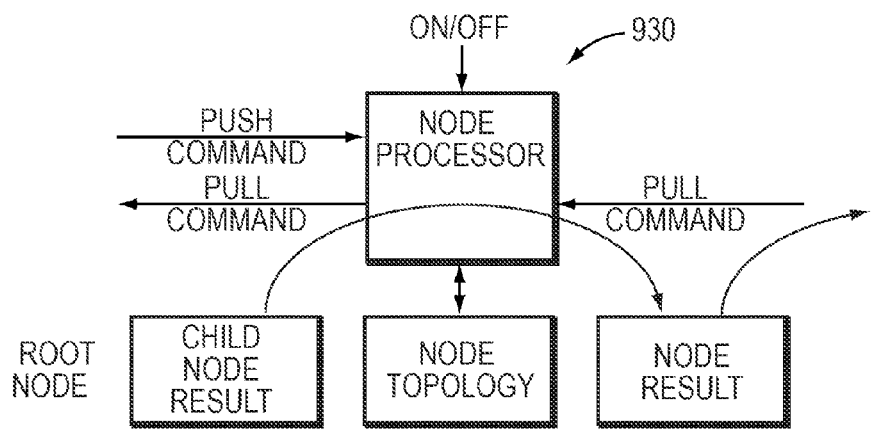

FIGS. 9A-C are block diagrams of model nodes. FIG. 9A provides a conceptual view of a model endpoint node 910. The endpoint 910 may be capable of receiving push commands, along with associated metapackets from an external source. The endpoint 910 stores these metapackets into a FIFO structure. The metapackets in the FIFO are available to be read and invalidated by the next node in the hierarchy. Endpoints can send push commands to their parent nodes. The topology record for Endpoints holds information about its FIFO state and does not contain a child reference.

FIG. 9B provides a conceptual view of a model internal node 920. The internal node 920 may be capable of receiving push commands from their children and pull commands from their parent. They may also be capable of sending pull commands to their children and push commands to their parent. A single result slot of the internal node can be made available to be read and invalidate by the parent node.

FIG. 9C provides a conceptual view of the model root node 930. The root 930 may be capable of receiving push commands from its children and pull commands from an external source. It is also capable of sending pull commands to its children. Its resulting metapacket may be made available to the outside source to be read and invalidated when used. The root's 930 topology record may not include a parent reference.

Referring to FIGS. 9A-C, all three node types 910, 920, 930 may also be capable of receiving "on" and "off" commands, which enable or disable a node. All commands, push, pull, on and off contain a references to the parent and child upon which the operation will be applied. In this manner a command specifies what operation to apply and where to find the child and parent data structures to apply them on.

Although the three different types of nodes 910, 920, 930 in the model may differ as described above, their function and data structures are similar enough that a single algorithm may be used for all three types. The single algorithm allows the various node calculations to easily be done on general purpose and/or custom hardware. In this manner, general purpose processors running software can be used to handle the higher hierarchy levels, while custom hardware can be used to handle the lower hierarchy levels. The commonality of data structures makes for efficient storage, retrieval and manipulation between general purpose hardware running software and custom hardware.

As a result of having a result metapacket at each node 910, 920, 930 in the topology, the calculation of which packet to transmit next can be divided into a set of smaller calculations that are evaluated on a node-by-node basis. Thus, an entire branch need not be simultaneously evaluated when a packet is transmitted. Breaking the calculation into smaller, atomic, pieces has several advantages. Although dependencies exist between adjacent nodes, the calculations can be done out of order; the calculations can be executed on the same or different processors; and the algorithm easily scales to large models with long branches with many nodes.

Referring back to the model 801 of FIG. 8B, the packet flow algorithm may use push and pull techniques to advance metapackets from the FIFOs (at EP1-EP35 810) to the network interface 830 on the right. Metapackets may be input to the model 801 according to which endpoint 810 they are being sent to. If the endpoint's parent node already has a result, then the input metapacket will queue in the endpoint's FIFO. If the endpoint's parent node does not already have a result, then the input metapacket is immediately advanced from the FIFO to become the result of the parent node via a "push" command. Push commands may be the means by which metapackets advance through the model 801 when results within a branch are empty, and are sent to a node by one of its children. A series of push commands will advance a metapacket down a branch until a node is found that already has a result. If no node is found to have a result then the metapacket will advance all the way through the tree to become node0's result.

When a node 820 receives a push command and it already has a result, the node that sourced the command is appended to the child list and the child's connection status is updated in a "splice" operation. Alternatively, when a node receives are push command and it does not already have a result then it advances the child's result to its own result, invalidates the child's result and forwards the push command to its parent. The parent then repeats the above process.

The push mechanism may be a primary means of metapacket advancement when the network is lightly loaded. When the network accepts packets faster than the model 801 is providing them, then, much of the time, the push commands will advance quickly through the model. However, when metapackets are input to the model 801 faster than the network can transmit them and branches begin to fill up, the push commands find fewer and fewer empty results to fill and the "pull" mechanism may instead become dominant. Pull commands, like push commands, may also direct nodes to advance metapackets from the result of a child node to its own result, but with differences. For example, if a node receiving a pull command does not have any connected children, then it advances a "bubble" metapacket and becomes idle through a "prune" operation. If there are connected children, then it advances the result from one of them to its own result, invalidates the child result and forwards the pull command to the child. The child then repeats the above process.

If the model 801 is busy, a series of pull commands may are initiated whenever Node0's result is transmitted into the network. Node0 first executes its own pull command to advance a child result to its own and then it forwards the pull command to the next node in the branch. This process may continue until the next metapacket is advanced from an endpoint FIFO.

As described above, a pull command may result in a prune, while a push command may result in a splice. Prunes and splices are operations applied to tree data structures that control whether or not a record is included as part of the data structure. An advantage of the model is that only the nodes that have metapackets to send (i.e. valid results) are included in the topology data structure. While a node's 820 topology record includes how the node fits into the network, the node may not be spliced into the data structure until it has a valid result. Conversely, when a node can no longer produce a valid result, it gets pruned from the data structure.

When a node 820 is spliced, it is said to become connected and when a node is pruned it is said to become disconnected. A node's connection status is tracked with two bits. The first bit, called p_con, tracks whether or not a node is connected to its parent. The second bit, called c_con, tracks whether or not a node has any connected child nodes. The p_con and c_con bits allow push and pull commands to quickly and efficiently determine whether the commands should continue to propagate or not.

The ON command enables a node to be connected into the data structure. If the node being turned ON already has a result then the node may be immediately spliced. The OFF command prevents a node from being connected into the data structure. A node that is connected will be pruned when an OFF command is received. Nodes that have been turn off will ignore all commands except an ON command. The ON and OFF commands are driven by an external entity and may be used as a simple form of flow control.

Figure 10:
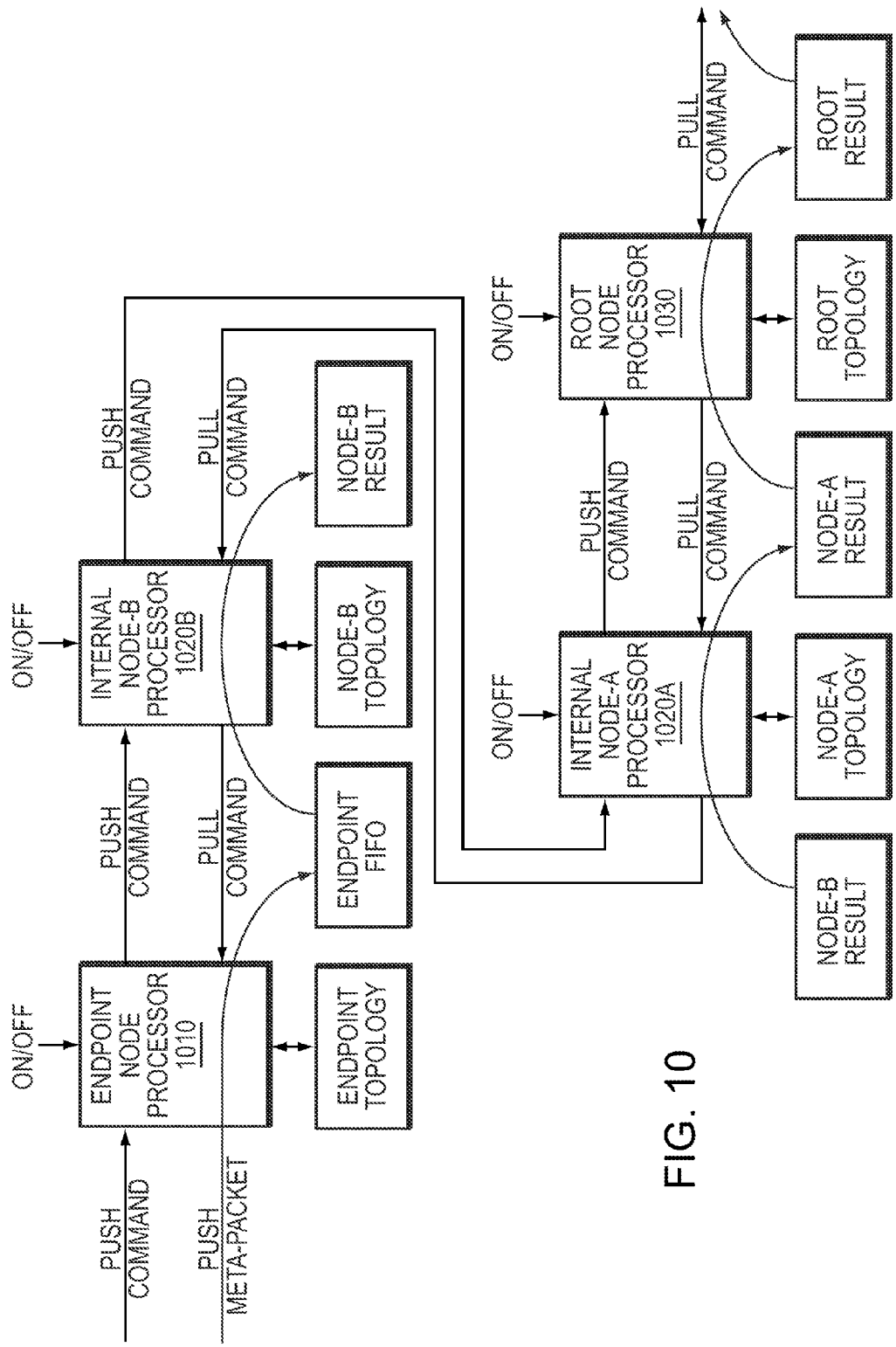
FIG. 10 is a block diagram of a model branch of nodes.

FIG. 10 is a block diagram of a model branch 1000 of nodes, which may represent a portion of a network model such as the model 801 of FIG. 8. The branch 1000 includes four nodes: an endpoint 1010 (comparable to the endpoint node 910 of FIG. 9A), internal nodes node-B 1020A and node-A 1020B (comparable to the internal node 920 of FIG. 9B), and a root node 1030 (comparable to the root node 930 of FIG. 9C). The endpoint 910 may represent a packet destination and the root node may represent a network interface. An example set of operations utilizing the branch 1000, including push and pull operations, are described below with reference to FIGS. 11A-E. Generally the figures show nodes receiving push or pull requests on a given step and then making state changes and metapacket advancements on the following step. A series of five metapacket pushes are shown followed by an XOFF, a subsequent XON and finally a series of five pull operations.

Figure 11B:
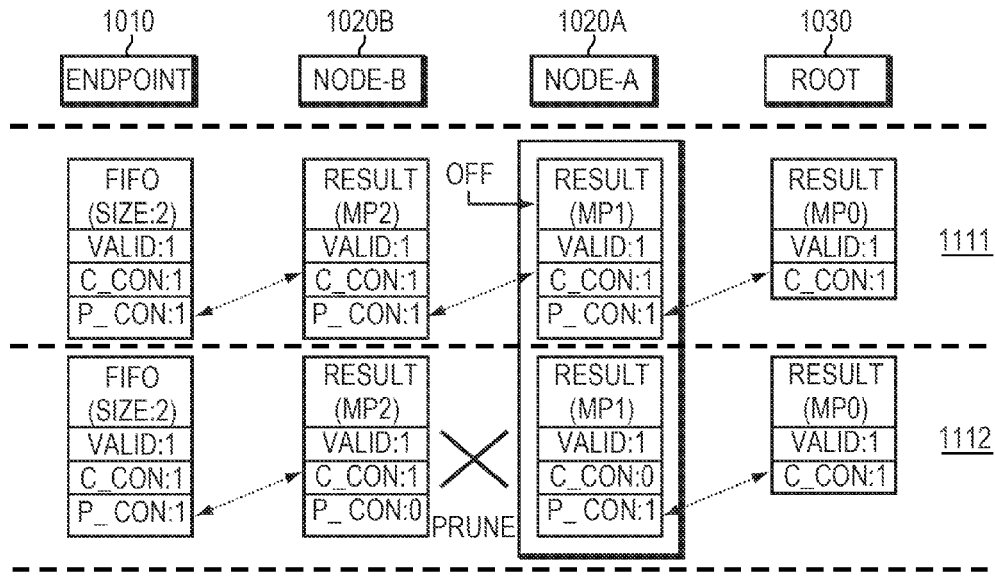
Figure 11C:
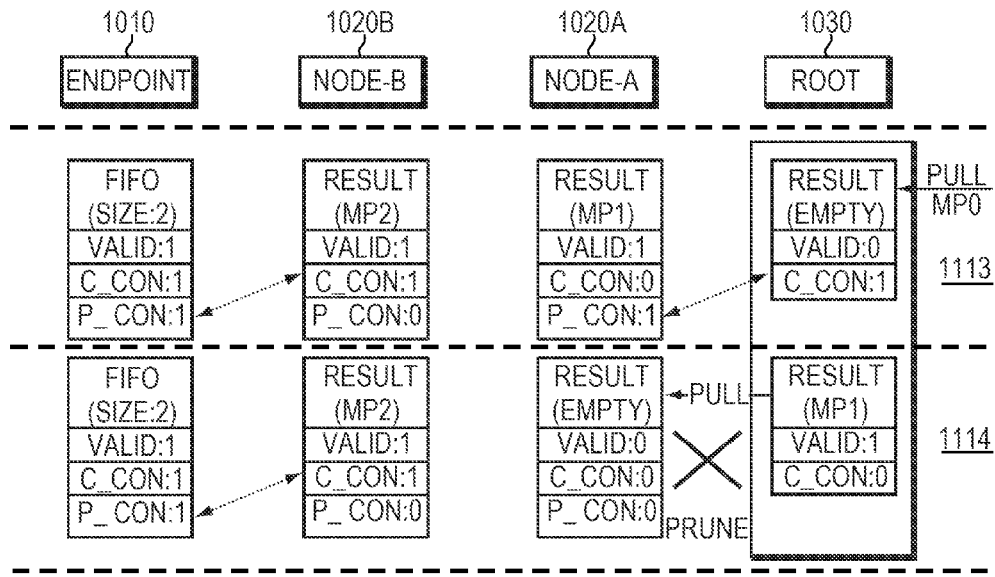
Figure 11D:
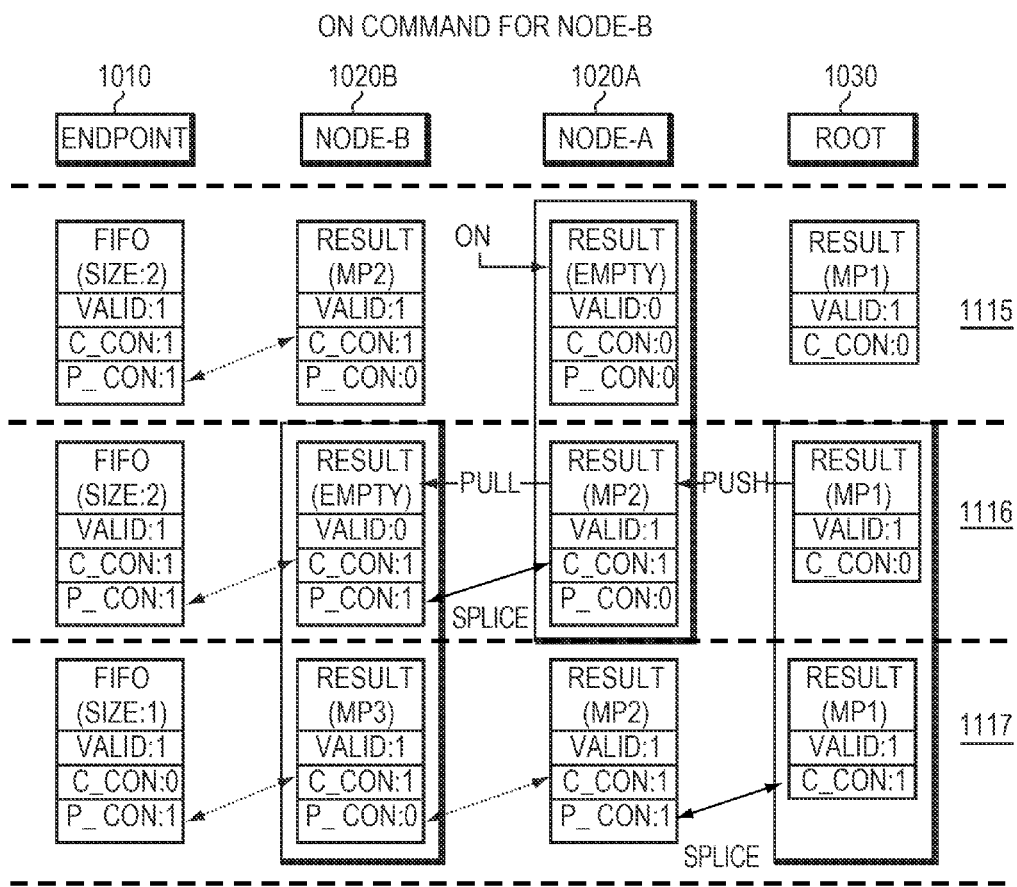

FIGS. 11A-E are diagrams illustrating commands and packet movement through a model branch. In particular, FIG. 11A illustrates a series of push commands, FIG. 11B illustrates an off command, FIG. 11C illustrates a further pull command following the off command, FIG. 11D illustrates an on command, and FIG. 11E illustrates a series of pull commands.

Referring first to FIG. 11A, in 1101, the branch is completely idle. The input FIFO of the endpoint node 1010 is empty, with size of zero, as well as all of the result slots of the three other nodes 1020A, 1020B, 1030. All of the valid, c_con and p_con bits are de-asserted at every level. The first activity is a push request for metapacket 0 (MP0) being sent to the endpoint 1010.

In 1102, the endpoint 1010 processes the push request for MP0. First MP0 is input to the FIFO and the FIFO size increases to one. Then, because the p_con bit is de-asserted, the endpoint 1010 sends a push request to its parent node, Node-B 1020A. Whenever a push command is processed where the p_con bit is found to be de-asserted and a push command is sent to the parent node, the push command is said to be "forwarded."

In 1103, node-B 1020 B processes the push command for MP0. Because node-B does not yet have a result and the both p_con and c_con bits are de-asserted, it moves MP0 to its own result and the endpoint's result is invalidated. Whenever a metapacket is moved in this fashion, it is said to "advance". Note that the depth of the endpoint's FIFO decreased back to zero and the endpoint's valid bit was cleared when Node-B invalidated its result. Since the p_con bit is de-asserted, a push is forwarded to Node-A.

In 1104, both the Endpoint and Node-A are active. The endpoint processes the push request for MP1. MP1 is input to the FIFO, the FIFO depth increases to 1, and a push is forwarded to Node-B. Simultaneously, Node-A processes a push request by advancing MP0 and forwarding a push to the root node.

In 1105, both Node-B and the Root node are active. Node-B processes the push request for MP1 by advancing MP1 and forwarding a push to Node-A. The Root advances MP0, but since it is the last node in the branch, there is no notion of forwarding the push. Instead, MP0 will remain as the Root's result until the attached network is ready to transmit it.

In 1106, both the endpoint and node-A are active. The endpoint processes the push request for MP2 by inputting MP2 into it FIFO and forwarding a push to node-B. Node-A processes a push request by advancing MP1 and forwarding a push to the Root.

In 1107, both node-B and the root node are active. Node-B processes the push request for MP2 by advancing MP2 and forwarding a push to Node-A. However, with regard to the root, the node 1030 receives a push while it already has a result. The root already has MP0 as its result so it cannot advance MP1. The root node instead does a splice by setting asserting c_con bit and asserting the p_con bit of the child result. This indicates to node-A that it should not forward anymore pushes to the root because no more packets can advance at this time. Conversely, it indicates to the root that its now connected child does have more metapackets to transmit.

In 1108, both the Endpoint and node-A are active. The endpoint 1010 processes the push request for MP3 by inputting MP2 into it FIFO and forwarding a push to node-B. Node-A processes a push but like the root in step 7, it too cannot advance the metapacket so it does a splice.

In 1109, node-B processes a push by performing a splice. At this point there is a valid result at every node in the branch and every node has been splice to its parent. It's important to note that this example only shows a single path where in practice Node-B, Node-A, and Root could have any number of connected child nodes. In this manner, the c_con bit means that are one or more connected child nodes.

In 1110, the endpoint pushed MP4 into it FIFO, increments the FIFO size to two and since the FIFO size becomes greater than one, the c_con bit is also asserted. The c_con bit for the Endpoint is an indication to node-B that more than one metapacket is queued in the FIFO.

Referring to FIG. 11B, 1111 shows an off request (XOFF) to node-A. The purpose of the XOFF request is to disable Node-B.

In 1112, node-A processes the XOFF by pruning node-B from its child list and Node-B's p_con bit is de-asserted. And in this simple example, since Nnode-B is node-A's only child, node-A's c_con bit is also de-asserted. node-B is effectively disconnected from node-A.

Referring to FIG. 11C, 1113 introduces the first pull operation to the example. The attached network decided to transmit MP0. In doing so, the root's result has been invalidated and a pull request has been issued to Root.

In 1114, the root executes the pull command by advancing MP1 from Node-A; however, since Node-A's result does not have its c_con bit asserted, the root does not forward the pull. The pull stops at the root and node-A is pruned.

Referring to FIG. 11D, in 1115, a XON request is sent to node-A. The purpose of the XON is to enable node-B.

In 1116, node-A advances MP2 because its own result slot was empty, it sends a push to the root and it sends a pull to node-B. Note that the push is sent because the p_con bit was de-asserted and the pull was sent because Nnode-B's c_con bit was asserted. node-B is also spliced to node-A also because node-B's p_con bit was de-asserted. The sub-branch stemming from node-B is now reconnected to node-A.

In 1117, both node-B and the root 1030 are active. The root 1030 processes the push by splicing Node-A. Node-B responds to the pull by advancing MP3 and as it is advanced, the endpoint FIFO size is decreased to one the c_con bit is de-asserted.

Referring to FIG. 11E, 1118 begins a series of pull command that result from metapackets being pulled from the root 1030. This starts with MP1 is pulled from the root.

In 1119, the root 1030 processes the pull by advancing MP2 and forwarding the pull to node-A 1020A.

In 1120, MP2 is pulled from the root and Node-A processes the pull by advancing MP3 are forwarding the pull to Node-B 1020B.

In 1121, both node-B and the root are active. Node-B process a pull by advancing MP4 from Endpoint. The Endpoint FIFO is now empty so it is pruned and its valid bit is de-asserted. Root advances MP3 and forwards a pull to Node-A.

In 1122, MP3 is pulled from the root and node-A processes a pull by advancing MP4. Node-B is pruned from node-A.

In 1123, the root processes the pull by advancing MP4 and pruning node-A.

In 1124, MP4 is pulled from the root. No other action is taken because there are no children currently connected to the root and thus no further metapackets available to send.

In example embodiments, the p_con and c_con bits may serve a purpose beyond speeding up command forwarding decisions. The operations run by the PSE may be optimized for simultaneous processing of multiple nodes, and the connection status bits are used by the algorithm to manage dependencies between parent and child nodes. For example, referring to FIG. 10, if node-A 1020A advances node-B's 1020A result and then issues a pull command to node-B 1020B, there is no guarantee that node-B 1020B will execute that pull command before node-A 1020A is again ready to advance node-B's result. Node-A 1020A may attempt to pull from node-B before node-B has produced its next result; however, since node-B will eventually execute the pull command, it is guaranteed that a valid result will become available. The c_con bit is used to manage this case. When a node reads a child result and finds the valid bit de-asserted while the c_con bit is asserted this indicates that a result will be available as soon as the pending pull command executes and the node is allowed to stall until the child result is available.

Conversely, when a push command encounters a result with its p_con bit asserted, this means that the result is already connected to the parent regardless of the valid bit and processing will proceed as if the result were valid. This ensures that pushes are not forwarded to the parent node when a pull is pending.

The connection bits may also be used to manage a critical interlock that prevents multiple processors from performing push and pull commands on the same node simultaneously. A collision occurs when a processor receives a push command from a child node for the same node that another processor has simultaneous received a pull command from a parent node. This happens often at the trailing end of connected sub-branches. The p_con bit is relevant to pull commands, while the c_con bit is relevant to pull commands. When a node reads its result and finds that the c_con bit asserted while the valid bit is de-asserted, this indicates that the result has been advanced by the parent node and there is an associated pull command pending to that node. This allows push commands to terminate upon the collision.

Packet Shaping

In order to determine the order in which to transmit packets, a PKO (e.g., PKOs 300, 700 described above with reference to FIGS. 3 and 7) may implement packet shaping and/or packet scheduling. In the examples described above, such shaping and scheduling may be operated by a respective PSE (e.g., PSEs 340, 740).

Network traffic shaping is a mechanism that limits the sending of packets to a specified rate. This is accomplished by delaying the transmission of a packet according to whether the specified rate has been exceeded or not. It has many practical applications, such as network congestion prevention, rate contract enforcement, and quality of service.

Packet throughput and latency is adversely affected when a network becomes congested. Too many packets sent into the network can lead to packets being dropped and then later re-sent. Packet shaping prevents network congestion by restricting the rate at which packets are transmitted into the network. In this manner, packets that would be normally transmitted are delayed until it is determined that the network can handle them. To implement packet shaping, the PSE may perform operations as described below with reference to FIGS. 12-15.

Figure 12A:
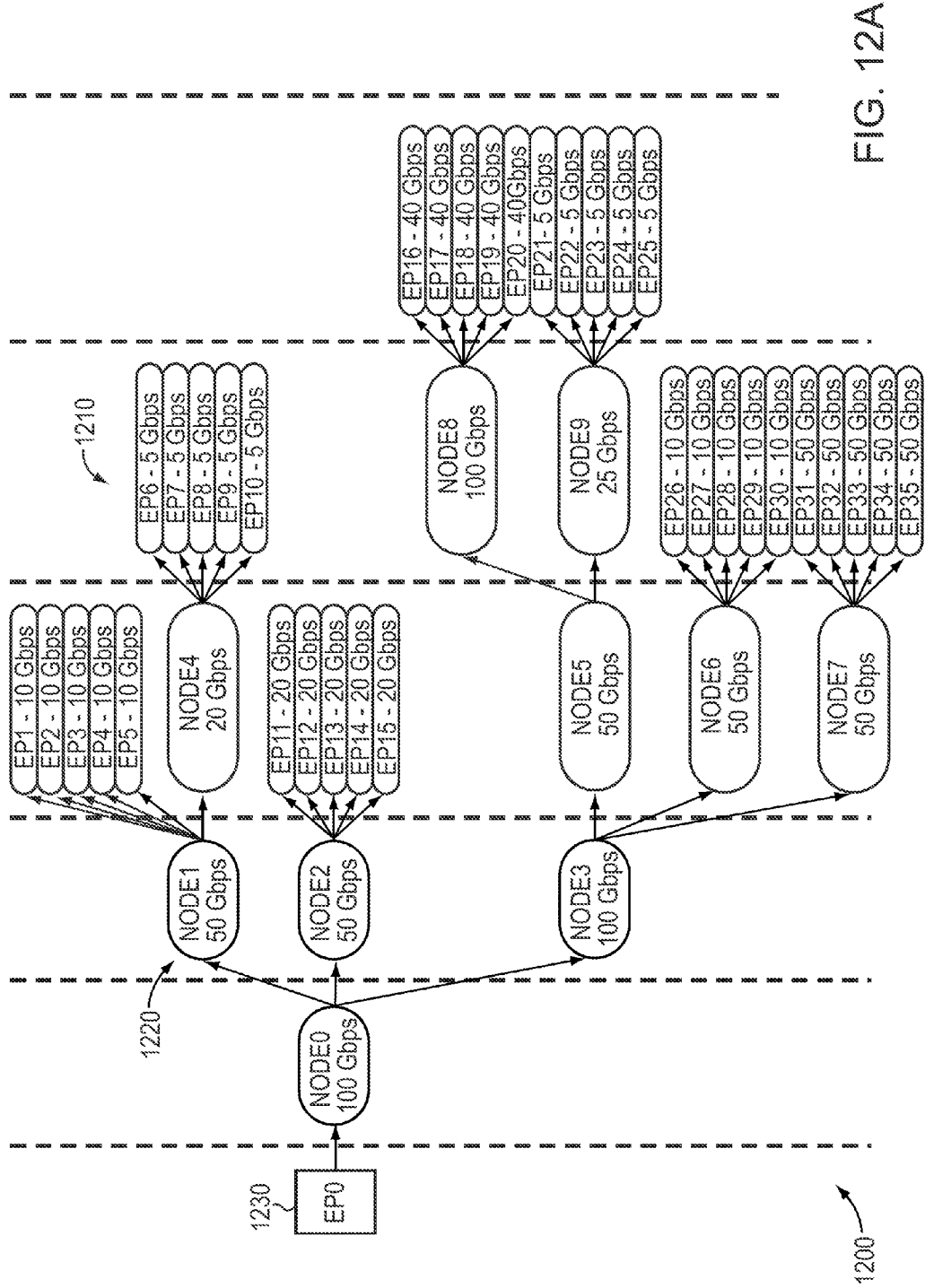

FIGS. 12A-B illustrate model network topologies for packet shaping. FIG. 12A shows an example model network topology 1200 from the viewpoint of the model, i.e., the end point hosting the PKO, shown as EP0 1230. EP0 1230 is able to send packets to a number of other endpoints 1210 (labeled EP1-EP35), through the set of intermediate nodes 820 (labeled Node0-Node9). To the PKO at the leftmost node 830, the network topology appears as a tree structure, with the PKO at the root. Branches in the tree represent the physical paths that packets traverse through the network to reach the other endpoints. In this view, EPOs transmitted packets flow up the tree through branches and eventually reach the leaves, which are the other endpoints. The model 1200 may be comparable to the model 800 described above with reference to FIG. 8A, with the addition of bandwidth limits indicated at each of the nodes 1220 and destination endpoints 1210.

In an example benefitting from packet shaping, the highlighted path shows a route from EP0 1230 to EP7. Along the path, Node0 is capable of a maximum throughput of 100 gigabits per second (Gbps). Congestion will occur at Node0 if EP0 1230 sends packets to it at a data rate faster than 100 Gbps. Similarly, congestion will occur if EP0 sends packets to node1 at a data rate higher than 50 Gbps; node4 at data rate higher than 20 Gbps; and EP7 at a data rate higher than 5 Gbps. Traffic shaping can be used to ensure that these rates are not exceeded.

Network traffic shaping may also be used to restrict a packet flow to meet a contractual service rate. In this manner, network service provider may offer different tiers of service based upon data rate. Network traffic shaping can be used to enforce the service rate. Network traffic shaping may also be used to restrict traffic flows based upon packet classification. Packet flows of different classes can be configured to have different guaranteed throughput. In this manner, a video packet flow can be configured to only take the amount of bandwidth needed to maintain visual coherence.

FIG. 12B illustrates a model network topology 801 that is reversed in order (i.e., a mirror image) from the topology 800 shown in FIG. 8A. In addition to the nodes 1220, endpoints 1210 and root 1230, network shapers 1215 are shown associated with each node 1220 and endpoint 1210.

Figure 13A:
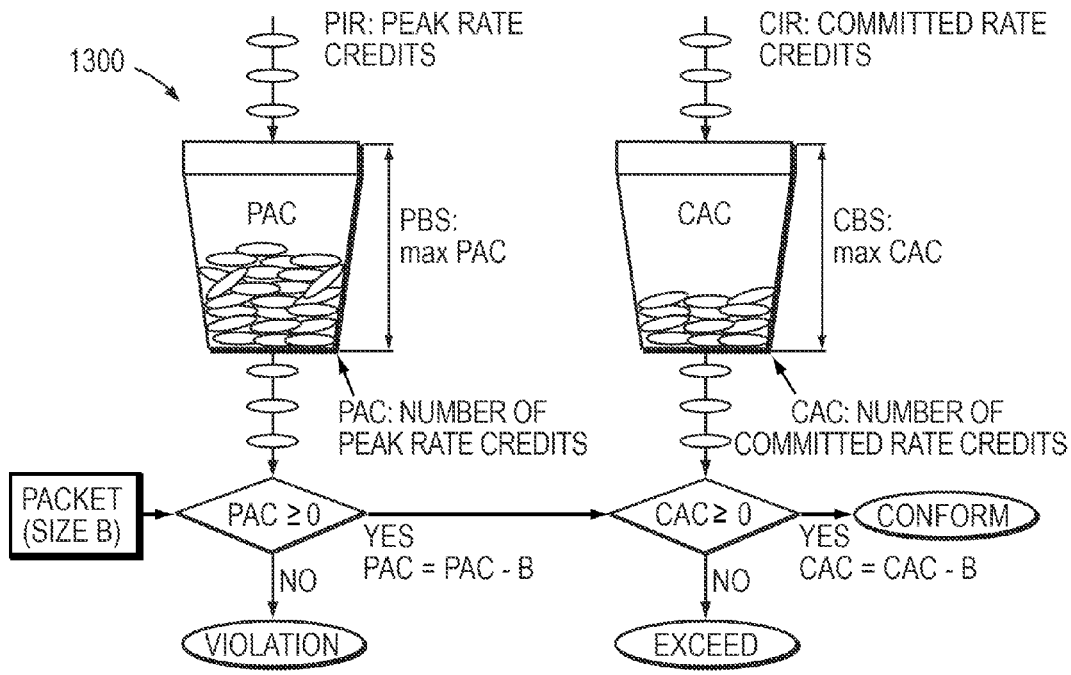
FIGS. 13A-B are block diagrams illustrating two and three-color shaping.
Figure 13B:
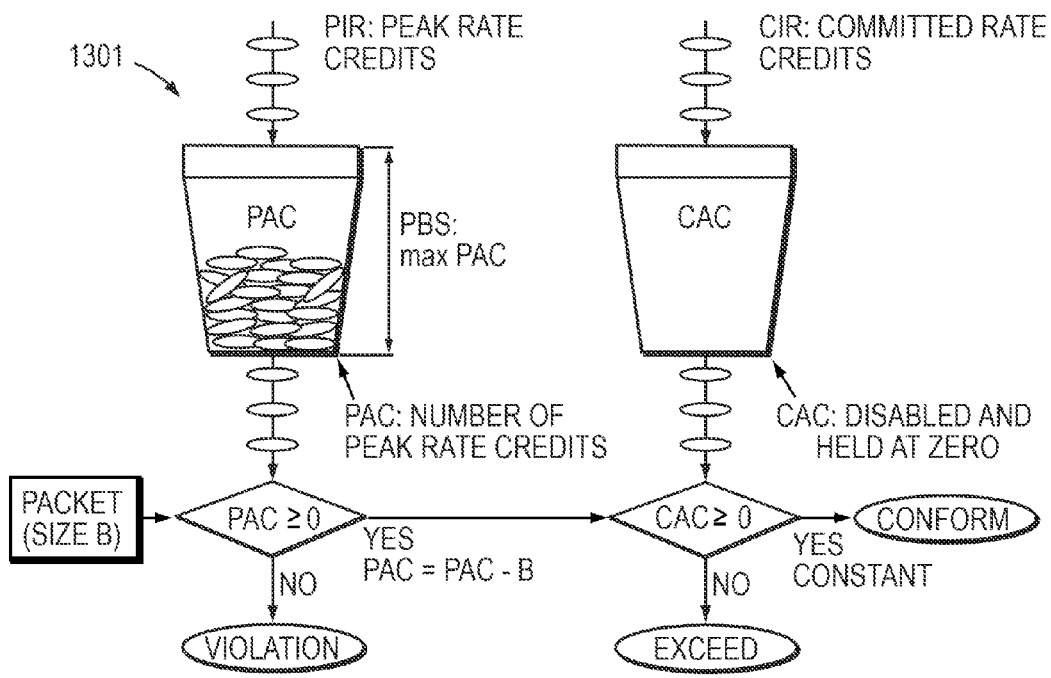

FIGS. 13A-B are block diagrams illustrating two and three-color shaping. FIG. 13A illustrates a dual-rate, three-color shaper model 1300 that may present at every node 1220 in the topology model 1201 of FIG. 12B. The shaper may be implemented by a combination of a shaping algorithm operated by the PSE and the supporting data structures for a node. The shaper algorithm may be based upon a token bucket as exemplified by the model 1300. In the model 1300, credits (i.e. tokens) are added to an accumulator (i.e. the bucket) to provide the credit that qualifies packet advancement. When credit is available, packets are allowed to advance. When credit is not available, packets may either be dropped, or stalled until credit becomes available, or advanced anyways depending upon how the shaper is configured.

One credit accumulator enforces a committed rate while the other enforces a peak (or excess) rate. The committed rate is the lower of the two rates and may be a guaranteed rate. Under normal conditions, packets should always make progress through a node at least at the committed rate. Then, whenever excess bandwidth available, nodes may pass packets up to their specified peak rate. Excess capacity may become available when peer child nodes do not use all of their committed bandwidth.

The CAC (Committed Accumulator) tracks the amount of credit available to advance packets at the committed rate. The CAC is a 26-bit value divided into an 18-bit signed integer portion and an 8-bit fractional portion. The size of the CAC gives the shaper a maximum possible burst size of 128 kilobytes. The PAC (Peak Accumulator) uses the same characteristics as the CAC to track credits available to advance packets at the peak rate.

The state of the two credit accumulators determines the color of the shaper: green, yellow or red. When both accumulators are positive the shaper color is green. Packets advancing in the green state are utilizing the node's committed bandwidth. When CAC is negative while PAC is positive the shaper is yellow and advancing packets are utilizing the node's excess bandwidth. When both CAC and PAC are both negative the shaper color is red and packets may or may not advance depending upon shaper configuration.

With respect to the model's topology data structure, node's that are allowed to advance meta-packets are spliced into the data structure. Nodes that are not allowed to advance meta-packets are pruned. Thus a node advancing a packet whose shaper is green will either be spliced or remain spliced to its parent node. Typically a node advancing a packet whose shaper becomes red will be pruned from its parent node.

When a shaper advances a meta-packet, one or both of its accumulators are debited according to the meta-packet's size field. When an accumulator value transitions from non-negative to negative this indicates a color downgrade. Colors may downgrade from green-to-yellow, green-to-red and yellow-to-red. When a downgrade occurs, the node must be removed from the child list it is currently reference in and moved to the child list of the new shaper color.

An example data structure for shaping data provided for each packet is illustrated in Table 1 below. The data structure of Table 1 may be included in a metapacket (e.g., the metapacket 500 in FIG. 5B), or may be implemented as a separate allocation that is associated with a packet via a pointer or other means.

TABLE 1

Example shaping data structure.

| Field Name | Size (bits) | Description |
| --- | --- | --- |
| CIR_ENA | 1 | Committed Rate Shaper Enable |
| CIR_CAC | 28 | Committed Rate Credit Accumulator—a signed integer credit counter with units of Bytes/256. |
| CIR_MAN | 8 | Committed Rate Mantissa |
| CIR_EXP | 4 | Committed Rate Exponent—used with Committed Rate Mantissa to calculate the intermediate Committed Rate Addend value. |
| CIR_DIV | 4 | Committed Rate Divider |
| CIR_CNT | 12 | Committed Rate Count—used with Committed Rate Divider to divide the credit update frequency. |
| CBS_MAN | 8 | Committed Burst Size Mantissa |
| CBS_EXP | 4 | Committed Burst Size Exponent—used with Committed Burst Size Mantissa to calculate the Committed Burst Size (i.e. the maximum allowed value of CIR_CAC). |
| PIR_ENA | 1 | Peak Rate Shaper Enable |
| PIR_CAC | 28 | Peak Rate Credit Accumulator—a signed integer credit counter with units of Bytes/256. |
| PIR_MAN | 8 | Peak Rate Mantissa |
| PIR_EXP | 4 | Peak Rate Exponent—used with Peak Rate Mantissa to calculate the intermediate Peak Rate Addend value. |
| PIR_DIV | 4 | Peak Rate Divider |
| PIR_CNT | 12 | Peak Rate Count—used with Peak Rate Divider to divide the credit update frequency. |
| PBS_MAN | 8 | Peak Burst Size Mantissa |
| PBS_EXP | 4 | Peak Burst Size Exponent—used with Peak Burst Size Mantissa to calculate the Peak Burst Size (i.e. the maximum allowed value of PIR_CAC). |
| ADJUST | 9 | Static Packet Size Adjustment—a signed integer applet to the packet size prior to updating the credit accumulators. |
| COLOR | 2 | Shaper color—Green, Yellow, Red_Send and Red_Drop |
| RED_ALG | 2 | Shaper Red-state Algorithm—Drop, Stall or Send |

Referring to Table 1, the 2-bit RED_ALGO field in the shaper data structure controls how the shaper will handle packets while in the red state. The shaper provides three options: DROP_ON_RED, STALL_ON_RED or SEND_ON_RED. As shown in the model 1300, no accumulators are updated if the shaper is red. This remains the case regardless of which processing option is selected. DROP_ON_RED advances the packet without any shaper state change while the meta-packet's drop bit is set. This signals to subsequent nodes that no further operations are to be performed on the meta-packet. The packet is to be treated as a NO-OP until it exits the topology. The external logic is then expected to drop the packet instead of transmitting it into the attached network. SEND_ON_RED advances the packet without any shaper state change. The packet is still treated as a NO-OP by the red shaper, but it is then treated just like any other packet by subsequent nodes. Note that packets advancing in the red state are likely to cause congestion and may ultimately be dropped in the network. STALL_ON_RED has the effect of pruning the node from the parent whenever the shaper reaches the red state. When pruned, the node is no longer included in any of its parent's child lists so it cannot receive any PULL command. The only thing that will eventually get the node SPLICED back in and advance a packet is a PUSH command coming from the time-wheel.

The PAC and CAC, as described above, each operate to track available credit and selectively advance packets based on the respective shaper data. CAC is limited by the CBS (Committed Burst Size) and PAC is limited by the PBS (Peak Burst Size). The CBS value is calculated from the CBS_MAN (an 8-bit mantissa) and the CBS_EXP fields (a 4-bit exponent) of the shaper data structure. Similarly, PBS is calculated from PBS_MAN and PBS_EXP fields. The equations for CBS and PBS follows:

$$CBS=(1+CBS\_MAN/256)*2^{CBS\_EXP}$$

$$PBS=(1+PBS\_MAN/256)*2^{PBS\_EXP}$$

The rate at which credits are added to the CAC is called the CIR (Committed Information Rate). The rate at which credits are added to the PAC is called the PIR (Peak Information Rate). These rates are specified in units of bytes per second. CIR is calculated from two intermediate values called CIR_ADD (CIR Addend) and CIR_PER (CIR Period). CIR_ADD specifies a number of bytes that is added to the CAC every time period specified by CIR_PER. PIR is similarly calculated from PIR_ADD and PIR_PER. The equations for CIR and PIR follows:

$$CIR=CIR\_ADD/CIR\_PER$$

$$PIR=PIR\_ADD/PIR\_PER$$

The CIR_ADD value is calculated from the CIR_MAN (8-bit mantissa) and CIR_EXP (4-bit exponent) fields of the shaper data structure. The PIR_ADD value is calculated from the PIR_MAN and PIR_EXP fields. The equations for CIR_ADD and PIR_ADD follows:

$$CIR\_ADD=(1+CIR\_MAN/256)*2^{CIR\_EXP}$$

$$PIR\_ADD=(1+PIR\_MAN/256)*2^{PIR\_exp}$$

The CIR_PER value is calculated using the period of the time-wheel hardware (TW_PER) and the 4-bit frequency divider field call CIR_DIV of the shaper data structure. The PIR_PER value is similarly calculated from the PIR_DIV field. The equations for CIR_PER and PIR_PER follows:

$$CIR\_PER=TW\_CLK\_PER*2^{CIR\_DIV}$$

$$PIR\_PER=TW\_CLK\_PER*2^{PIR\_DIV}$$

Figure 14:
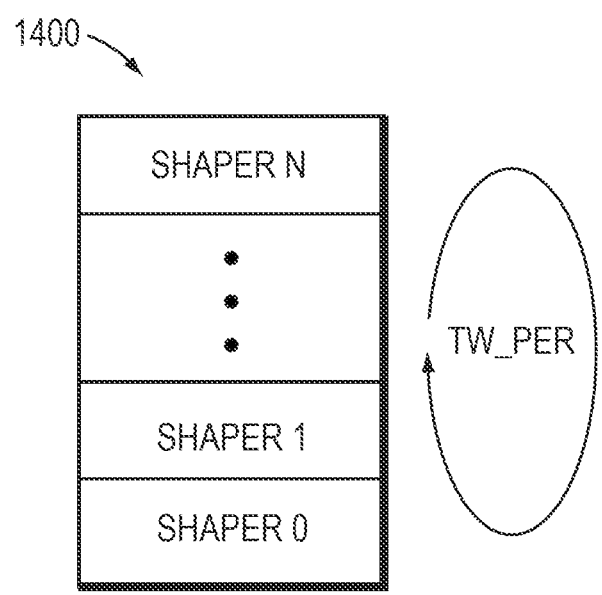
FIG. 14 is a block diagram of a time wheel.

The time-wheel period (TW_PER) is dictated by hardware implementation of the time-wheel. FIG. 14 shows a simplified time wheel 1400. The time-wheel cycles through shaper data structures using a simple counter as an index. For each index, the time-wheel reads the shaper data structure from memory; uses the fields in the data structure to calculate the next CAC and PAC values and then stores those values back to memory. In an example embodiment, the PKO may support up to 256 shaper data structures per time-wheel, and the associated time-wheel period is 768 nanoseconds.

One function of the time-wheel 14 is to send SPLICE commands to the parent node whenever the shaper changes state as a result of adding credit to the accumulators. Whenever an accumulator value crosses from a negative value to a positive value, the shaper has changed state. These state changes can be red-to-yellow, red-to-green, or yellow-to-green transitions. When the shaper changes state, the associated node must be moved from the old color list to the new color list. This is done with a SPLICE command to the parent node.

Referring again to Table 1 above, metapackets may include a 2-bit field called COLOR, which is used for marking packets based upon the shaper states the metapacket encounters while passing through the model network topology. In one embodiment, the metapacket color may always start as green as it enter the model. Whenever a green marked meta-packet encounters a yellow shaper, its color is downgraded to yellow. Whenever a green or yellow marked meta-packet encounters a red shaper, its color is downgraded to red. The resulting metapacket's color will reflect the lowest shaper color encountered in the model when it exits the model. The external logic may then alter the packet based upon this color classification.

As described above, green or yellow shapers debit their credit accumulators according to the size of the packet whenever a packet is advanced. Two mechanisms are provided for adjusting the packet size. This adjustment may reflect packet encapsulation or CRC insertion or any kind of downstream packet manipulation that will change the packet's size before actual transmission in the attached network.

Relative to the shaper, one adjustment is static and the other is dynamic. The static adjustment is a 9-bit signed integer field contained within the shaper data structure called ADJUST. This adjustment is applied to all packets passing through the shaper. The other adjustment is a 9-bit signed integer field carried in the meta-packet itself also called ADJUST. This adjustment applies only the meta-packet carrying the adjustment. Both adjustments are applied prior to updating the credit accumulators as follows:

ADJ_PKT_SIZE=PKT_SIZE+SHAPER[ADJUST]+META_PKT[ADJUST]

FIG. 13B, in contrast to FIG. 13A, illustrates a single-rate, two-color shaper model 1301. The model may be comparable to the model 1300 described above, but with the CAC being disabled (illustrated by the blacked-out components) and held at zero to provide single-rate, two-color shaping.

FIG. 14 is a block diagram of a time wheel 1400, which is described in further detail above with reference to FIG. 13A.

Figure 15:
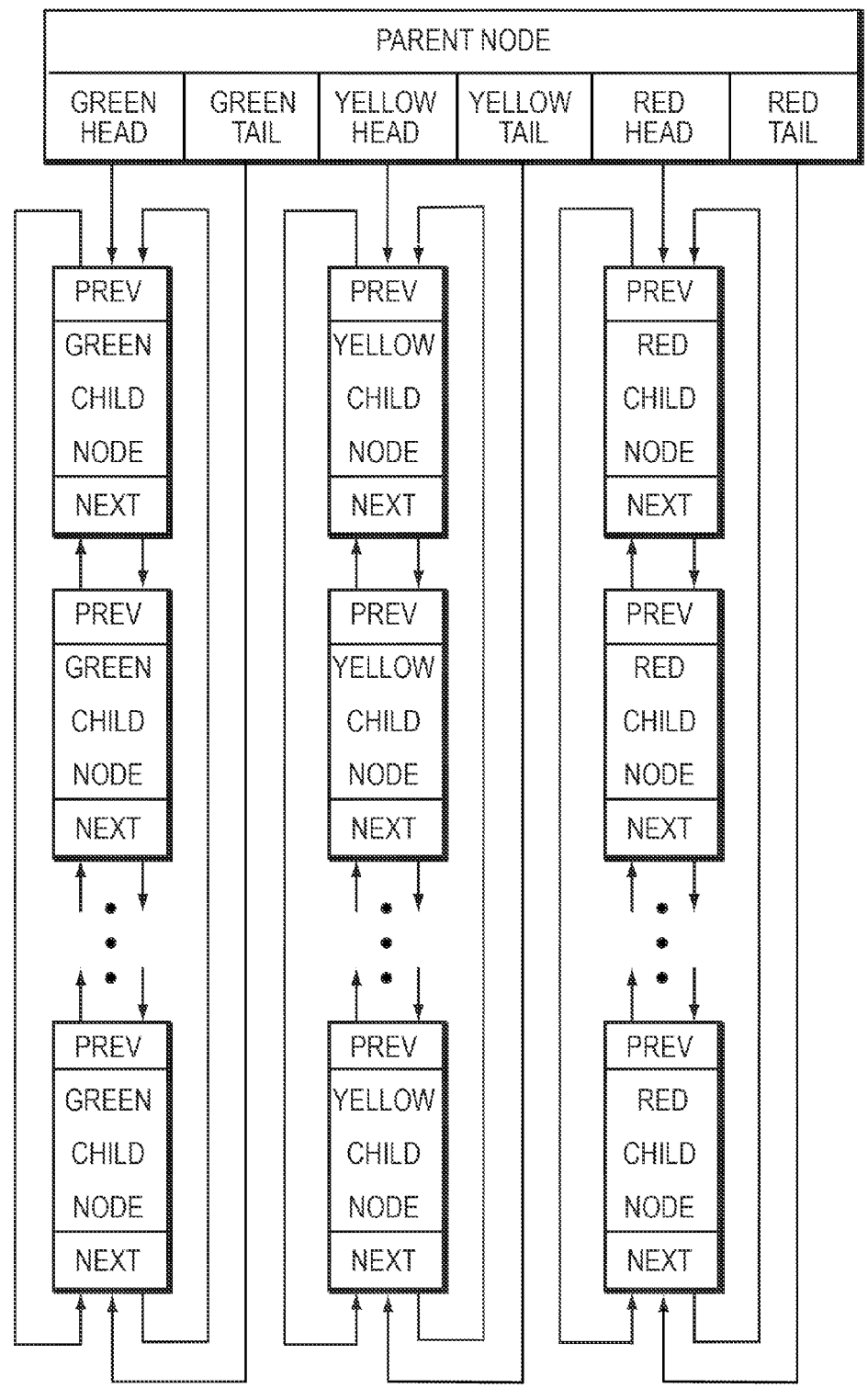
FIG. 15 is a flow diagram illustrating packet shaping.

FIG. 15 is a flow diagram illustrating how the topology data structure of the model nodes may be updated to maintain three child lists corresponding to the three possible shaper colors. When a node is spliced to its parent, the color of the node's shaper determines the list to which it will be appended. When spliced, nodes with green shapers may be appended to the parent's green list; nodes with yellow shapers may be appended to the parent's yellow list; nodes with red shapers configured to send-on-red may be appended to the red list; and nodes with red shapers configured to stall-on-red may be pruned.

It should be understood that the example flow diagrams presented above can be readily converted to modules, subsystems, or systems that operate in a similar manner as set forth above. For example, the example embodiments may include an initialization module, computing module, and reporting module.

It should be further understood that the examples presented herein can include more or fewer components, be partitioned into subunits, or be implemented in different combinations. Moreover, the diagrams herein may be implemented in hardware, firmware, or software. If implemented in software, the software may be written in any suitable software language. The software may be embodied on any form of computer readable medium, such Random Access Memory (RAM), Read-Only Memory (ROM), or magnetic or optical disk, and loaded and executed by generic or custom processor(s).

While this invention has been particularly shown and described with references to example embodiments thereof, it will be understood by those skilled in the art that various changes in form and details may be made therein without departing from the scope of the invention encompassed by the appended claims.

What is claimed is:

1. A circuit for managing transmittal of packets, the circuit comprising:
   a packet descriptor manager (PDM) circuit module configured to generate a metapacket and a descriptor from a command signal, the command signal identifying a packet to be transmitted by the circuit, the metapacket including an entry stating a size of the packet;
   a packet scheduling engine (PSE) circuit module configured to determine an order in which to transmit the packet among a plurality of packets, the PSE determining whether to select the packet as a next packet in the order based on a time at which the metapacket is advanced from a modeled endpoint node, the time being a function of the size and a destination across a network of the packet indicated in the metapacket; and
   a packet engines and buffering module (PEB) circuit module configured to perform processing operations on the packet to produce a processed packet based on instructions indicated in the descriptor, the PEB causing the processed packet to be transmitted toward the destination.

2. The circuit of claim 1, wherein the PDM further includes a metapacket queue, the PDM being configured to store the metapacket to the metapacket queue.

3. The circuit of claim 2, wherein the PSE is further configured to retrieve at least a portion of the metapacket from the metapacket queue.

4. The circuit of claim 1, wherein the PDM further includes a descriptor queue, the PDM being configured to store the descriptor to the descriptor queue.

5. The circuit of claim 4, wherein the PEB is further configured to retrieve at least a portion of the descriptor from the descriptor queue.

6. The circuit of claim 1, wherein the PSE is further configured to compare a packet transmission rate associated with the destination against at least one of a peak rate and a committed rate associated with the destination, the PSE determining the order based on the comparison.

7. The circuit of claim 6, wherein the PSE is further configured to assign a color to the packet based on the comparison.

8. The circuit of claim 6, wherein the PSE is further configured to compare, for a plurality of nodes in a path between the circuit and the destination, a packet transmission rate associated with the node against at least one of a peak rate and a committed rate associated with the node, the PSE determining the order based on the comparison.

9. The circuit of claim 1, wherein the PSE is further configured to model transmission of the packet through a model of a network topology from the destination to the circuit, the PSE determining the order based on the model transmission.

10. The circuit of claim 9, wherein the PSE is further configured to model a plurality of nodes in the network topology between the destination and the circuit.

11. The circuit of claim 9, wherein the PSE is further configured to determine the order based on arrival of the packet relative to other packets at the circuit in the model transmission.

12. The circuit of claim 11, wherein the PSE is further configured to model transmission of the plurality of packets from a plurality of respective destinations to the circuit, the PSE determining the order based arrival of the packet among the plurality of packets in the model transmission.

13. The circuit of claim 12, wherein the PSE is further configured to model a plurality of nodes in the network topology between the plurality of destinations and the circuit.

14. The circuit of claim 13, wherein the PSE is further configured to assign relative priority to each of the inputs of the model plurality of nodes.

15. The circuit of claim 13, wherein the PSE is further configured to model transmission of the plurality of packets through the model plurality of nodes based on a deficit-weighted round robin calculation.

16. The circuit of claim 1, wherein the PEB is further configured to construct the packet based on pointers in the descriptor, the pointers indicating addresses of a memory storing the packet.

17. The circuit of claim 1, wherein the PEB is further configured to store the processed packet to an output buffer, the PEB causing the packet to be transmitted based on a credit status associated with the buffer.

18. The circuit of claim 1, wherein the metapacket includes an indication of a size of the packet and instructions for ordering the packet.

19. The circuit of claim 1, wherein the descriptor includes 1) pointers indicating addresses of a memory storing the packet and 2) instructions for processing the packet by the PEB.

20. The circuit of claim 1, wherein the command signal further indicates instructions for constructing and processing the packet.

21. The circuit of claim 1, wherein the PEB is further configured to mark the packet with a color indicating compliance with packet traffic rules.

22. The circuit of claim 1, wherein the PEB is further configured to add a timestamp to the packet.

23. The circuit of claim 1, wherein the PEB is further configured to drop a packet based on an indication from the PSE.

24. A method of managing transmittal of packets, the method comprising:
  receiving, at a circuit for managing transmittal of packets, a command signal identifying a packet to be processed and transmitted;
  generating, at the circuit, a metapacket from the command signal, the metapacket including an entry stating a size of the packet and instructions for ordering the packet;
  generating, at the circuit, a descriptor from the command signal, the descriptor including 1) pointers indicating addresses of a memory storing the packet and 2) instructions for processing the packet;
  determining, at the circuit, whether to select the packet as a next packet in an order in which to transmit the packet among a plurality of packets based on a time at which the metapacket is advanced from a modeled endpoint node, the time being a function of the size and a destination across a network of the packet indicated in the metapacket;
  processing, at the circuit, operations on the packet to produce a processed packet based on instructions indicated in the descriptor; and
  causing, at the circuit, the processed packet to be transmitted toward the destination.

* * * * *